US012802560B2

(12) United States Patent
Fei et al.

(10) Patent No.: US 12,802,560 B2
(45) Date of Patent: Nov. 17, 2026

(54) METHOD AND APPARATUS FOR GENERATING COMMUNICATION CAPABILITY INFORMATION, AND METHOD AND APPARATUS FOR USING COMMUNICATION CAPABILITY INFORMATION

(71) Applicant: Yinwang Intelligent Technologies Co., Ltd., Shenzhen (CN)

(72) Inventors: Wenkai Fei, Beijing (CN); Jianqin Liu, Shenzhen (CN); Yong Wu, Beijing (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 111 days.

(21) Appl. No.: 18/585,740

(22) Filed: Feb. 23, 2024

(65) Prior Publication Data

US 2024/0194057 A1 Jun. 13, 2024

Related U.S. Application Data

(63) Continuation of application No. PCT/CN2022/104408, filed on Jul. 7, 2022.

(30) Foreign Application Priority Data

Aug. 23, 2021 (CN) ........................ 202110970028.8

(51) Int. Cl.
*G08G 1/01* (2006.01)
*G01C 21/34* (2006.01)

(52) U.S. Cl.
CPC ....... *G08G 1/0116* (2013.01); *G01C 21/3461* (2013.01)

(58) Field of Classification Search
CPC .......................... G08G 1/0116; G01C 21/3461
(Continued)

(56) References Cited

U.S. PATENT DOCUMENTS 8,190,362 B2 * 5/2012 Barker ................ G08G 1/0104 701/487
10,203,699 B1 * 2/2019 Kim .................... G05D 1/0285
(Continued)

FOREIGN PATENT DOCUMENTS

CN 103167547 A 6/2013
CN 111516690 A 8/2020
(Continued)

OTHER PUBLICATIONS

Jaymin D. Mankowitz et al: "Mobile device-based cellular network coverage analysis using crowd sourcing," EUROCON—International Conference on Computer as a Tool, 2011 IEEE, Apr. 27-29, 2011, Lisbon Portugal, Apr. 27, 2011, total 6 pages.

*Primary Examiner* — Luis A Martinez Borrero
(74) *Attorney, Agent, or Firm* — Conley Rose, P.C.

(57) ABSTRACT

A method for generating communication capability information includes obtaining first communication status indication information used to indicate a plurality of terminal devices to establish a communication connection to a first roadside device at a plurality of position points; determining, based on the first communication status indication information, a first distribution status of the plurality of position points indicated by the first communication status indication information around the first roadside device; and generating first communication capability information of the first roadside device based on the first distribution status.

20 Claims, 13 Drawing Sheets

(58) Field of Classification Search
USPC .......................................................... 701/423
See application file for complete search history.

(56) References Cited

U.S. PATENT DOCUMENTS

| | | | | |
|---|---|---|---|---|
| 10,466,717 | B1 * | 11/2019 | Su | G05D 1/0285 |
| 10,712,165 | B2 * | 7/2020 | Chakra | G01C 21/3617 |
| 11,783,709 | B2 * | 10/2023 | Yoshikawa | G08G 1/096741 340/905 |
| 11,854,391 | B2 * | 12/2023 | Ran | G08G 1/096725 |
| 12,279,210 | B2 * | 4/2025 | Shuman | G08G 1/096758 |
| 2012/0252438 | A1 * | 10/2012 | Mehio | H04W 24/08 455/423 |
| 2016/0091333 | A1 * | 3/2016 | Chakra | G01C 21/3617 701/425 |
| 2016/0091334 | A1 * | 3/2016 | Chakra | G01C 21/3617 701/425 |
| 2018/0233042 | A1 * | 8/2018 | Zhang | G08G 1/096791 |
| 2018/0310242 | A1 * | 10/2018 | Konishi | G08G 1/164 |
| 2019/0088125 | A1 * | 3/2019 | Park | G01S 5/0072 |
| 2019/0373609 | A1 * | 12/2019 | Kim | H04W 72/541 |
| 2019/0387564 | A1 * | 12/2019 | Kim | H04W 76/15 |
| 2020/0120458 | A1 * | 4/2020 | Aldana | H04W 12/069 |
| 2020/0342760 | A1 * | 10/2020 | Vassilovski | B60W 30/18159 |
| 2021/0005085 | A1 * | 1/2021 | Cheng | G08G 1/012 |
| 2021/0099831 | A1 | 4/2021 | Gong et al. | |
| 2021/0112388 | A1 * | 4/2021 | Rosales | G01C 21/3461 |
| 2021/0354722 | A1 * | 11/2021 | Kim | B60K 35/10 |
| 2022/0015004 | A1 * | 1/2022 | Nakano | B60R 11/02 |
| 2022/0230545 | A1 * | 7/2022 | Yoshikawa | G08G 1/052 |
| 2022/0322147 | A1 * | 10/2022 | Hu | H04W 76/14 |
| 2023/0007712 | A1 * | 1/2023 | Peng | H04W 8/24 |
| 2023/0090975 | A1 | 3/2023 | Lei | |
| 2023/0156621 | A1 * | 5/2023 | Shuman | G08G 1/096758 455/522 |
| 2023/0300579 | A1 * | 9/2023 | Merwaday | B60L 53/67 701/423 |
| 2024/0038058 | A1 * | 2/2024 | Sadu | H04L 67/12 |
| 2024/0078903 | A1 * | 3/2024 | Park | H04L 63/0442 |
| 2024/0169826 | A1 * | 5/2024 | Fei | G08G 1/0116 |
| 2024/0179664 | A1 * | 5/2024 | Wu | H04W 64/00 |
| 2024/0244410 | A1 * | 7/2024 | Fei | H04W 4/021 |
| 2024/0292302 | A1 * | 8/2024 | Hua | G08G 1/164 |
| 2025/0218285 | A1 * | 7/2025 | Sadu | B60Q 5/005 |

FOREIGN PATENT DOCUMENTS

| | | | | |
|---|---|---|---|---|
| CN | 111556360 A | | 8/2020 | |
| CN | 111681439 A | | 9/2020 | |
| CN | 112584314 A | | 3/2021 | |
| CN | 113119962 A | | 7/2021 | |
| CN | 115905431 A | | 4/2023 | |
| EP | 3349514 A1 | | 7/2018 | |
| WO | WO-2017084713 A1 | * | 5/2017 | H04W 24/08 |
| WO | 20201013203 A1 | | 1/2021 | |

* cited by examiner

METHOD AND APPARATUS FOR GENERATING COMMUNICATION CAPABILITY INFORMATION, AND METHOD AND APPARATUS FOR USING COMMUNICATION CAPABILITY INFORMATION

CROSS-REFERENCE TO RELATED APPLICATIONS

This is a continuation of International Patent Application No. PCT/CN2022/104408 filed on Jul. 7, 2022, which claims priority to Chinese Patent Application No. 202110970028.8 filed on Aug. 23, 2021. The disclosures of the aforementioned applications are hereby incorporated by reference in their entireties.

TECHNICAL FIELD

This application relates to the field of intelligent transportation, intelligent driving, and map technologies, and in particular, to a method and an apparatus for generating communication capability information, and a method and an apparatus for using communication capability information.

BACKGROUND

In a self-driving or assisted driving process, perception of a road environment is a primary task. A self-driving or assisted driving vehicle may use a high-precision map as basic driving reference information. The high-precision map is different from a conventional navigation map. The high-precision map has information layers that are more precise than a common navigation map, to reflect more comprehensive road information. The information layers in the high-precision map are classified into a static layer and a dynamic layer. The static layer is used to reflect static information such as a specific lane model. The dynamic layer is used to reflect dynamic information such as a traffic light condition and a road condition.

Communication information provided by a roadside device may be used as reference information for decision-making and control of intelligent driving. Therefore, a communication capability of the roadside device is an important factor that affects intelligent driving safety.

Before delivery, a device manufacturer generally marks a communication range of the roadside device. Because the communication range of the roadside device is related to factors such as a road structure and a building obstruction, there is a deviation between an actual communication range of the roadside device and a communication range designed at delivery. Because a large quantity of roadside devices is deployed and a mounting scenario is complex, it is not practical to separately test a communication range at each mounting point. This requires a large amount of manpower and material resources. How to conveniently and accurately determine the actual communication range of the roadside device becomes a problem that needs to be urgently resolved currently.

SUMMARY

In view of this, a method and an apparatus for generating communication capability information, and a method and an apparatus for using communication capability information are provided, to conveniently and accurately obtain a communication range of a roadside device.

According to a first aspect, an embodiment of this application provides a method for generating communication capability information, where the method includes obtaining first communication status indication information, where the first communication status indication information is used to indicate a plurality of terminal devices to establish a communication connection to a first roadside device at a plurality of position points; determining a first distribution status of the plurality of position points around the first roadside device based on the first communication status indication information; and generating first communication capability information of the first roadside device based on the first distribution status, where the first communication capability information is used to indicate a communication capability of the first roadside device.

In this embodiment of this application, a region that can be reached by the communication capability of the first roadside device is determined based on the distribution status of the plurality of position points of the plurality of terminal devices that establish a communication connection to the first roadside device, to conveniently and accurately obtain a communication range of the first roadside device.

According to the first aspect, in a first possible implementation of the method for generating a communication capability, the method further includes storing the first communication capability information as map data. In this way, map information can be enriched, to provide help for decision-making and control of intelligent driving.

According to the first aspect or the first possible implementation of the first aspect, in a second possible implementation of the method for generating communication capability information, the method further includes obtaining second communication status indication information, where the second communication status indication information is used to indicate a first at least one first terminal device to establish a communication connection to a second roadside device at a first at least one first position point, and a distance between the first at least one first position point and the first roadside device is less than a preset threshold; and determining a second distribution status of the first at least one position point around the first roadside device based on the second communication status indication information; and generating first communication capability information of the first roadside device based on the first distribution status includes generating the first communication capability information based on the first distribution status and the second distribution status.

In this embodiment of this application, the second distribution status is used to reflect a position point that actually exists around the first roadside device and at which a communication connection can be established to the first roadside device, and the first distribution status is used to reflect a position point to which the first roadside device actually establishes a communication connection. A difference between the position point to which the first roadside device actually establishes a communication connection and the position point that actually exists around the first roadside device and at which a communication connection can be established to the first roadside device may be obtained based on the first distribution status and the second distribution status. In this way, a region in which the first roadside device can perform communication or has a strong communication capability and a region in which the first roadside device cannot perform communication or has a poor communication capability can be determined.

According to the first aspect or the first possible implementation of the first aspect, in a third possible implementation of the method for generating communication capability information, the method further includes obtaining third communication status indication information, where the third communication status indication information is used to indicate a second at least one terminal device to establish a communication connection to a server at a second at least one position point, the second at least one terminal device has a capability of connecting to the first roadside device, and a distance between the second at least one position point and the first roadside device is less than a preset threshold; and determining a third distribution status of the second at least one position point around the first roadside device based on the third communication status indication information; and generating first communication capability information of the first roadside device based on the first distribution status includes generating the first communication capability information based on the first distribution status and the third distribution status.

In this embodiment of this application, the third distribution status is used to reflect a position point that actually exists around the first roadside device and at which a communication connection can be established to the first roadside device, and the first distribution status is used to reflect a position point to which the first roadside device actually establishes a communication connection. A difference between the position point to which the first roadside device actually establishes a communication connection and the position point that actually exists around the first roadside device and at which a communication connection can be established to the first roadside device may be obtained based on the first distribution status and the third distribution status. In this way, a region in which the first roadside device can perform communication or has a strong communication capability and a region in which the first roadside device cannot perform communication or has a poor communication capability can be determined.

According to any one of the first aspect or the foregoing possible implementations of the first aspect, in a fourth possible implementation of the method for generating communication capability information, the first communication capability information is used to indicate a first region and a communication capability of the first roadside device in the first region.

In this way, the communication capability of the first roadside device is determined based on a region such that accuracy of the communication capability can be improved.

According to any one of the first aspect or the first possible implementation to the third possible implementation of the first aspect, in a fifth possible implementation of the method for generating communication capability information, the first communication capability information is used to indicate a first scenario, a first region, and a communication capability of the first roadside device in the first scenario and the first region.

In this way, the communication capability of the first roadside device is determined based on a region and a scenario, so that accuracy of the communication capability can be improved.

According to any one of the first aspect or the foregoing possible implementations of the first aspect, in a sixth possible implementation of the method for generating communication capability information, the first communication status indication information includes position information of the plurality of position points, working status information of a plurality of communication modules in the plurality of terminal devices, connection status information between the plurality of terminal devices and the first roadside device, identifier information of the first roadside device, and time information.

In this embodiment of this application, a position point at which the terminal device is located may be determined based on the position information, whether the terminal device has a capability of establishing a communication connection to the first roadside device may be determined based on the working status information of the communication module, and whether the terminal device actually establishes a communication connection to the first roadside device may be determined based on the connection status information between the terminal device and the first roadside device. Therefore, position points at which the plurality of terminal devices establish a communication connection to the first roadside device may be determined based on the first communication status information.

According to any one of the first aspect or the foregoing possible implementations of the first aspect, in a seventh possible implementation of the method for generating communication capability information, the method further includes generating a plurality of pieces of communication capability information of a plurality of roadside devices, where the plurality of pieces of communication capability information are used to indicate communication capabilities of the plurality of roadside devices, the plurality of roadside devices include the first roadside device, and the plurality of pieces of communication capability information include the first communication capability information; and generating communication blind area information based on the plurality of pieces of communication capability information, where the communication blind area information is used to indicate a region that is not covered by one or more of the plurality of roadside devices.

In this embodiment of this application, the communication capability information of all the roadside devices is integrated to form an overall communication coverage capability, thereby further improving accuracy of the communication capability.

According to the seventh possible implementation of the first aspect, in an eighth possible implementation of the method for generating communication capability information, the region that is not covered by one or more of the plurality of roadside devices includes: an absolute blind area and/or a relative blind area, any one of the plurality of roadside devices cannot reach a second threshold in the absolute blind area, and some of the plurality of roadside devices cannot reach a third threshold in the relative blind area.

In this embodiment of this application, the absolute blind area and the relative blind area are distinguished from each other such that accuracy of a blind area can be improved.

According to any one of the first aspect or the foregoing possible implementations of the first aspect, in a ninth possible implementation of the method for generating communication capability information, the method further includes that when a preset condition is met, updating the first communication capability information, where the preset condition includes a current value of a communication capability indicator indicated by the first communication capability information is abnormal relative to a statistical value of the communication capability indicator; and fault maintenance is performed on the first roadside device; the first roadside device is upgraded; or an obstruction is added or reduced around the first roadside device.

In this embodiment of this application, accuracy of the first communication capability information can be improved by updating the first communication capability information.

According to any one of the first aspect or the foregoing possible implementations of the first aspect, in a tenth possible implementation of the method for generating communication capability information, the method further includes generating warning prompt information based on the first communication capability information, where the warning prompt information is used to give the following prompt: taking over a vehicle by a driver in a second region, performing fault detection on the first roadside device, updating software of the first roadside device or adjusting deployment of the first roadside device, reducing confidence of information from the first roadside device in the second region, or avoiding the second region during route planning, and the first communication capability information indicates that a communication capability of the first roadside device in the second region is lower than a first threshold.

In this embodiment of this application, driving safety can be improved by generating the warning prompt information.

According to the first aspect, in an eleventh possible implementation of the method for generating the communication capability information, the first distribution status is a density of a first position point.

According to the second possible implementation or the third possible implementation of the first aspect, in a twelfth possible implementation of the method for generating communication capability information, generating the first communication capability information based on the first distribution status and the second distribution status includes determining a stable connection rate based on the first distribution status and the second distribution status, and generating the first communication capability information based on the stable connection rate.

According to the second possible implementation or the third possible implementation of the first aspect, in a thirteenth possible implementation of the method for generating communication capability information, generating the first communication capability information based on the first distribution status and the third distribution status includes determining a stable connection rate based on the first distribution status and the third distribution status, and generating the first communication capability information based on the stable connection rate.

According to any one of the first aspect or the foregoing possible implementations of the first aspect, in a fourteenth possible implementation of the method for generating communication capability information, that a current value of a communication capability indicator indicated by the first communication capability information is abnormal relative to a statistical value of the communication capability indicator includes: a difference between a first communication region and a second communication region that correspond to a target communication capability level is greater than a first difference threshold corresponding to the target communication capability level. The target communication capability level is any one of communication capability levels of the first roadside device, the first communication region represents a communication region corresponding to the target communication capability level indicated by the current value of the communication capability indicator, and the second communication region represents a communication region corresponding to the target communication capability level indicated by the statistical value of the communication capability indicator. The current value of the communication capability indicator indicated by the first communication capability information may indicate communication capability information obtained in a first time period before a current moment. The statistical value of the communication capability indicator indicated by the first communication capability information may indicate communication capability information obtained in a second time period before the current moment. Duration of the first time period is less than duration of the second time period, and a moment corresponding to the first time period is later than a moment corresponding to the second time period.

According to any one of the first aspect or the foregoing possible implementations of the first aspect, in a fifteenth possible implementation of the method for generating communication capability information, that a current value of a communication capability indicator indicated by the first communication capability information is abnormal relative to a statistical value of the communication capability indicator includes: in a communication region corresponding to a target communication capability level in the statistical value of the communication capability indicator, a ratio of a data volume of position points in a current dataset B to a quantity of position points in a current dataset A is less than a third difference threshold; and the current dataset A is used to indicate traffic participant data that is in traffic participant data collected in a first time period before a current moment, that falls within a preselection range of the first roadside device, and in which working status information is a normal working state, and the current dataset B indicates a traffic participant that is in the traffic participant data indicated by the current dataset A and in which device identifier information includes identifier information of the first roadside device.

According to a second aspect, an embodiment of this application provides a method for using communication capability information, where the method includes obtaining communication capability information, where the communication capability information is used to indicate a region and a communication capability of a roadside device in the region; and based on the communication capability information, generating warning prompt information, adjusting, in the region, confidence of information communicated by the roadside device, or planning a driving route that does not pass through the region. In this way, self-driving safety can be improved.

According to the second aspect, in a first possible implementation of the method for using communication capability information, the communication capability information is further used to indicate a scenario and a communication capability of the roadside device in the scenario and the region. In this way, the method can be applied to different scenarios, to further improve self-driving safety.

According to the second aspect or the first possible implementation of the second aspect, in a second possible implementation of the method for using communication capability information, the warning prompt information is used to give the following prompt: taking over a vehicle by a driver in the region, being careful to avoid a vehicle in the region, performing fault detection on the roadside device, reducing, in the region, confidence of information obtained by the roadside device through communication, or avoiding the region during route planning, and the communication capability information indicates that the communication capability of the roadside device in the region is lower than a first threshold. In this way, safety can be improved.

According to the second aspect or the first possible implementation or the second possible implementation of the second aspect, in a third possible implementation of the method for using communication capability information, the roadside device is a plurality of roadside devices, the region includes an absolute blind area, and the absolute blind area is a region in which communication capabilities of the plurality of roadside devices cannot reach a second threshold.

According to the second aspect or the first possible implementation or the second possible implementation of the second aspect, in a fourth possible implementation of the method for using communication capability information, the roadside device is a plurality of roadside devices, the region includes a relative blind area, and the relative blind area is a region in which communication capabilities of some of the plurality of roadside devices cannot reach a third threshold.

According to any one of the second aspect or the foregoing possible implementations of the second aspect, in a fifth possible implementation of the method for using the communication capability information, the method further includes storing the communication capability information as map data. In this way, map information can be enriched, to provide help for decision-making and control of intelligent driving.

According to a third aspect, an embodiment of this application provides an apparatus for generating communication capability information, where the apparatus includes a first obtaining module configured to obtain first communication status indication information, where the first communication status indication information is used to indicate a plurality of terminal devices to establish a communication connection to a first roadside device at a plurality of position points; a first determining module configured to determine a first distribution status of the plurality of position points around the first roadside device based on the first communication status indication information; and a first generation module configured to generate first communication capability information of the first roadside device based on the first distribution status, where the first communication capability information is used to indicate a communication capability of the first roadside device.

According to the third aspect, in a first possible implementation of the apparatus for generating a communication capability, the apparatus further includes a storage module configured to store the first communication capability information as map data.

According to the third aspect or the first possible implementation of the third aspect, in a second possible implementation of the apparatus for generating communication capability information, the apparatus further includes a second obtaining module configured to obtain second communication status indication information, where the second communication status indication information is used to indicate a first at least one terminal device to establish a communication connection to a second roadside device at a first at least one position point, and a distance between the first at least one position point and the first roadside device is less than a preset threshold; and a second determining module configured to determine a second distribution status of the first at least one position point around the first roadside device based on the second communication status indication information; and the first generation module is further configured to generate the first communication capability information based on the first distribution status and the second distribution status.

According to the third aspect or the first possible implementation of the third aspect, in a third possible implementation of the apparatus for generating communication capability information, the apparatus further includes a third obtaining module configured to obtain third communication status indication information, where the third communication status indication information is used to indicate a second at least one terminal device to establish a communication connection to a server at a second at least one position point, the second at least one terminal device has a capability of connecting to the first roadside device, and a distance between the second at least one position point and the first roadside device is less than a preset threshold; and a third determining module configured to determine a third distribution status of the second at least one position point around the first roadside device based on the third communication status indication information; and the first generation module is further configured to generate the first communication capability information based on the first distribution status and the third distribution status.

According to any one of the third aspect or the foregoing possible implementations of the third aspect, in a fourth possible implementation of the apparatus for generating communication capability information, the first communication capability information is used to indicate a first region and a communication capability of the first roadside device in the first region.

According to any one of the third aspect or the first possible implementation to the third possible implementation of the third aspect, in a fifth possible implementation of the apparatus for generating communication capability information, the first communication capability information is used to indicate a first scenario, a first region, and a communication capability of the first roadside device in the first scenario and the first region.

According to any one of the third aspect or the foregoing possible implementations of the third aspect, in a sixth possible implementation of the apparatus for generating communication capability information, the first communication status indication information includes position information of the plurality of position points, working status information of a plurality of communication modules in the plurality of terminal devices, connection status information between the plurality of terminal devices and the first roadside device, identifier information of the first roadside device, and time information.

According to any one of the third aspect or the foregoing possible implementations of the third aspect, in a seventh possible implementation of the apparatus for generating communication capability information, the apparatus further includes a second generation module configured to generate a plurality of pieces of communication capability information of a plurality of roadside devices, where the plurality of pieces of communication capability information are used to indicate communication capabilities of the plurality of roadside devices, the plurality of roadside devices include the first roadside device, and the plurality of pieces of communication capability information include the first communication capability information; and a third generation module configured to generate communication blind area information based on the plurality of pieces of communication capability information, where the communication blind area information is used to indicate a region that is not covered by one or more of the plurality of roadside devices.

According to the seventh possible implementation of the third aspect, in an eighth possible implementation of the apparatus for generating communication capability information, the region that is not covered by one or more of the plurality of roadside devices includes an absolute blind area and/or a relative blind area, any one of the plurality of roadside devices cannot reach a second threshold in the absolute blind area, and some of the plurality of roadside devices cannot reach a third threshold in the relative blind area.

According to any one of the third aspect or the foregoing possible implementations of the third aspect, in a ninth possible implementation of the apparatus for generating communication capability information, the apparatus further includes an update module configured to: when a preset condition is met, update the first communication capability information, where the preset condition includes: a current value of a communication capability indicator indicated by the first communication capability information is abnormal relative to a statistical value of the communication capability indicator; and fault maintenance is performed on the first roadside device; the first roadside device is upgraded; or an obstruction is added or reduced around the first roadside device.

According to any one of the third aspect or the foregoing possible implementations of the third aspect, in a tenth possible implementation of the apparatus for generating communication capability information, the apparatus further includes a fourth generation module configured to generate warning prompt information based on the first communication capability information, where the warning prompt information is used to give the following prompt: taking over a vehicle by a driver in a second region, performing fault detection on the first roadside device, updating software of the first roadside device or adjusting deployment of the first roadside device, reducing confidence of information from the first roadside device in the second region, or avoiding the second region during route planning, and the first communication capability information indicates that a communication capability of the first roadside device in the second region is lower than a first threshold.

According to a fourth aspect, an embodiment of this application provides an apparatus for using communication capability information, where the apparatus includes an obtaining module configured to obtain communication capability information, where the communication capability information is used to indicate a region and a communication capability of a roadside device in the region; and a generation module configured to: based on the communication capability information, generate warning prompt information, adjust, in the region, confidence of information communicated by the roadside device, or plan a driving route that does not pass through the region.

According to the fourth aspect, in a first possible implementation of the apparatus for using communication capability information, the communication capability information is further used to indicate a scenario and a communication capability of the roadside device in the scenario and the region.

According to the fourth aspect or the first possible implementation of the fourth aspect, in a second possible implementation of the apparatus for using communication capability information, the warning prompt information is used to give the following prompt: taking over a vehicle by a driver in the region, being careful to avoid a vehicle in the region, performing fault detection on the roadside device, reducing, in the region, confidence of information obtained by the roadside device through communication, or avoiding the region during route planning, and the communication capability information indicates that the communication capability of the roadside device in the region is lower than a first threshold.

According to the fourth aspect or the first possible implementation or the second possible implementation of the fourth aspect, in a third possible implementation of the apparatus for using communication capability information, the roadside device is a plurality of roadside devices, the region includes an absolute blind area, and the absolute blind area is a region in which communication capabilities of the plurality of roadside devices cannot reach a second threshold.

According to the fourth aspect or the first possible implementation or the second possible implementation of the fourth aspect, in a fourth possible implementation of the apparatus for using communication capability information, the roadside device is a plurality of roadside devices, the region includes a relative blind area, and the relative blind area is a region in which communication capabilities of some of the plurality of roadside devices cannot reach a third threshold.

According to any one of the fourth aspect or the foregoing possible implementations of the fourth aspect, in a fifth possible implementation of the apparatus for using communication capability information, the apparatus further includes a storage module configured to store the communication capability information as map data.

According to a fifth aspect, an embodiment of this application provides an apparatus for generating communication capability information, where the apparatus may perform the method for generating communication capability information according to the first aspect or one or several of the plurality of possible implementations of the first aspect.

The apparatus for generating communication capability information according to the fifth aspect may be a server, or a component, a hardware module, or a chip in the server, or may be a roadside device, or a component, a hardware module, or a chip in the roadside device. This is not limited herein.

According to a sixth aspect, an embodiment of this application provides an apparatus for using communication capability information, where the apparatus may perform the method for using communication capability information according to the second aspect or one or several of the plurality of possible implementations of the second aspect.

The apparatus for using communication capability information according to the sixth aspect may be a server, or a component, a hardware module, or a chip in the server, or may be a roadside device, or a component, a hardware module, or a chip in the roadside device, or may be a vehicle, or a component, a hardware module, or a chip in the vehicle, or may be a portable terminal, or a component, a hardware module, or a chip in the portable terminal. This is not limited herein.

According to a seventh aspect, an embodiment of this application provides a computer program product, including computer-readable code or a computer-readable storage medium carrying computer-readable code. When the computer-readable code runs in a processor, the processor performs the method for generating communication capability information according to the first aspect or one or several of the possible implementations of the first aspect, or the method for using communication capability information according to the second aspect or one or several of the possible implementations of the second aspect.

According to an eighth aspect, an embodiment of this application provides a map, including communication capability information, where the communication capability information is used to indicate a region and a communication capability of a roadside device in the region.

The map is a map product, and a specific form of the map may be map data, a map database, or a map application. This is not specifically limited herein.

According to the eighth aspect, in a first possible implementation of the map, the communication capability information is further used to indicate a scenario and a communication capability of the roadside device in the scenario and the region.

According to the eighth aspect or the first possible implementation of the eighth aspect, in a second possible implementation of the map, the roadside device is a plurality of roadside devices, the region includes an absolute blind area, and the absolute blind area is a region in which communication capabilities of the plurality of roadside devices cannot reach a second threshold.

According to the eighth aspect or the first possible implementation of the eighth aspect, in a third possible implementation of the map, the roadside device is a plurality of roadside devices, the region includes a relative blind area, and the relative blind area is a region in which communication capabilities of some of the plurality of roadside devices cannot reach a third threshold.

According to any one of the eighth aspect or the foregoing possible implementations of the eighth aspect, in a fourth possible implementation of the map, the map further includes waring prompt information, the warning prompt information is used to give the following prompt: taking over a vehicle by a driver in the region, being careful to avoid a vehicle in the region, performing fault detection on the roadside device, reducing, in the region, confidence of information obtained by the roadside device through communication, or avoiding the region during route planning, and the communication capability information indicates that the communication capability of the roadside device in the region is lower than a first threshold.

According to a ninth aspect, an embodiment of this application provides a computer-readable storage medium, where the computer-readable storage medium stores the map according to the eighth aspect or one or several of the plurality of possible implementations of the eighth aspect.

According to a tenth aspect, an embodiment of this application provides a vehicle, including the apparatus for using an information capability according to the third aspect or one or several of the plurality of possible implementations of the third aspect.

These aspects and other aspects of this application are more concise and more comprehensive in descriptions of the following (a plurality of) embodiments.

BRIEF DESCRIPTION OF DRAWINGS

The accompanying drawings included in this specification and constituting a part of this specification and this specification jointly show example embodiments, features, and aspects of this application, and are intended to explain the principles of this application.

DESCRIPTION OF EMBODIMENTS

The following describes various example embodiments, features, and aspects of this application in detail with reference to the accompanying drawings. Identical reference signs in the accompanying drawings indicate elements that have same or similar functions. Although various aspects of embodiments are illustrated in the accompanying drawing, the accompanying drawings are not necessarily drawn in proportion unless otherwise specified.

The specific term "example" herein means "used as an example, embodiment or illustration". Any embodiment described as an "example" is not necessarily explained as being superior or better than other embodiments.

In addition, to better describe this application, numerous specific details are given in the following specific implementations. A person skilled in the art should understand that this application can also be implemented without some specific details. In some embodiments, methods, means, elements and circuits that are well-known to a person skilled in the art are not described in detail, so that the subject matter of this application is highlighted.

Figure 1:
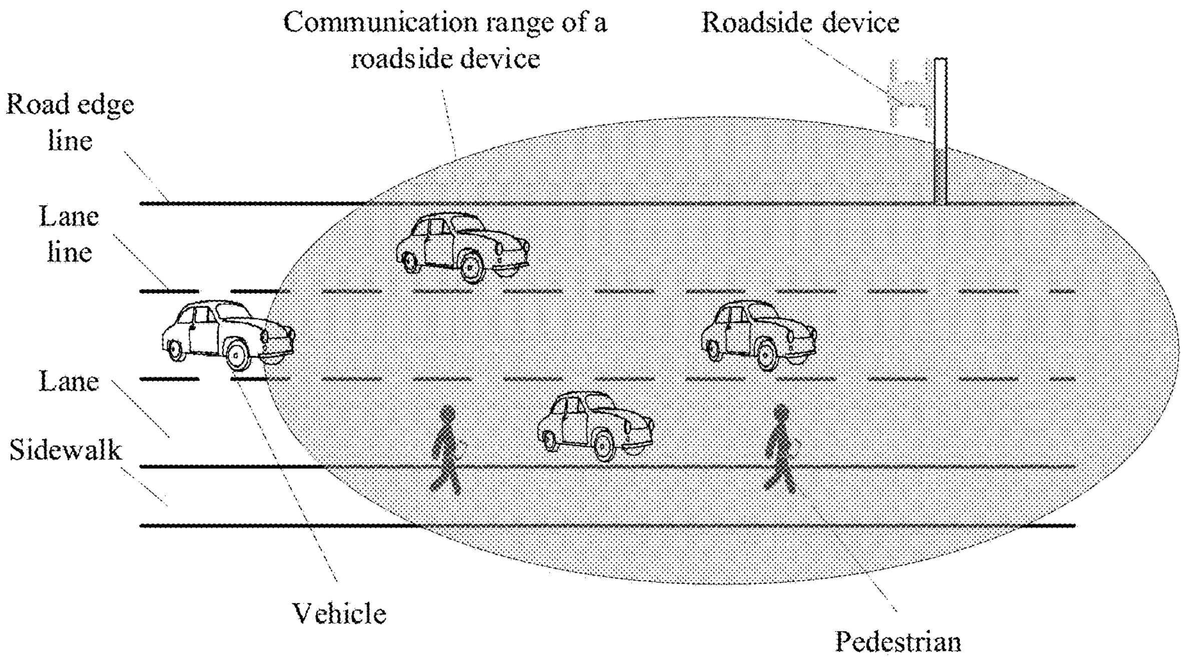
FIG. 1 is a schematic diagram of an application scenario according to an embodiment of this application.

FIG. 1 is a schematic diagram of an application scenario according to an embodiment of this application. As shown in FIG. 1, there is a vehicle traveling on a road, and there is a pedestrian walking on a roadside. A roadside device is disposed on the roadside or above the road. The roadside device may sense a surrounding traffic participant (for example, a vehicle, a pedestrian, or a non-motor vehicle) by using a sensor apparatus (for example, a microwave radar, a millimeter-wave radar, or a camera) of the roadside device. After establishing a communication connection to a surrounding terminal device, the roadside device may send sensed information to the surrounding terminal device as communication information, to provide reference for decision-making and control of intelligent driving of the terminal device. The terminal device in this embodiment of this application includes but is not limited to a vehicle-end device that can be mounted in a vehicle and a portable mobile terminal. The mobile terminal may be a smartphone, a tablet computer, a wearable electronic device (such as a smart band, a smartwatch, or smart glasses), or the like.

In this embodiment of this application, a positioning module is configured in the terminal device, for example, a Global Positioning System (GPS) and a BeiDou navigation satellite system (BDS). The positioning module may be configured to collect position information of the terminal device and corresponding time information. In an example, the position information may be absolute coordinates (namely, latitude and longitude coordinates) or relative coordinates. The time information may be a coordinated universal time (Universal Time Coordinated (UTC)) timestamp.

In this embodiment of this application, a communication module configured to communicate with the roadside device is further configured in the terminal device. In an example, the communication module may be an onboard communication unit (On Board Unit (OBU)). In another example, the communication module may be a wireless communication module in the mobile terminal. Working status information of the communication module may be used to indicate a working status of the communication module. In an example, the working status information of the communication module may be a normal working state, an abnormal working state, or a non-started state. The normal working state indicates that the communication module has been started and can work normally (that is, can establish a communication connection to the roadside device), the abnormal working state indicates that the communication module has been started but cannot work normally (that is, cannot establish a communication connection to the roadside device), and the non-start state indicates that the communication module is not started. It may be understood that, when the communication module in the terminal device is in an abnormal working state or a non-started state, even if the terminal device is in a communication range of a roadside device, the terminal device cannot establish a communication connection to the roadside device. When the communication module in the terminal device is in a normal working state, if the terminal device is in a communication range of a roadside device, the terminal device may establish a communication connection to the roadside device.

In this embodiment of this application, a communication module configured to communicate with the terminal device is configured in the roadside device. In an example, the communication module in the roadside device may be a roadside communication unit (road side unit (RSU)). A communication connection may be established between the vehicle-end device and the roadside device by using a vehicle-to-everything (V2X) technology such as a dedicated short-range communication (DSRC) technology. Further, a V2X communication connection may be established between the vehicle-end device and the roadside device by using an onboard unit and a roadside unit. In another example, the communication module in the roadside device may be a wireless communication module. A communication connection may be established between the mobile terminal and the roadside device by using a wireless communication technology such as a Wi-Fi technology. Further, a wireless communication connection may be established between the mobile terminal and the roadside device by using a wireless communication module.

It should be noted that the foregoing descriptions are merely examples of the terminal device, the positioning module, and the communication module in this embodiment of this application, and do not constitute a specific limitation. The terminal device in this embodiment of this application may alternatively be another device that can collect position information of the terminal device and that can communicate with the roadside device.

As shown in FIG. 1, a communication range of the roadside device is limited. When a distance between the terminal device and the roadside device is long or there is an obstruction between the terminal device and the roadside device (for example, the terminal device and the roadside device are separated by a building), the roadside device possibly cannot establish a communication connection to the terminal device, or a communication effect between the roadside device and the terminal device is poor (for example, stability is poor or signal strength is low). When a distance between the terminal device and the roadside device is short and there is no obstruction between the terminal device and the roadside device, the roadside device can establish a communication connection with a good communication effect to the terminal device. When the roadside device can establish a communication connection with a good communication effect to a terminal device in a region, it indicates that the region falls within the communication range of the roadside device. When the roadside device cannot establish a communication connection with a good communication effect to a terminal device in a region, it indicates that the region is beyond the communication range of the roadside device. Based on the communication range of the roadside device, a specific region in which information collected by the roadside device is comprehensive and has high reliability and a specific region in which information collected by the roadside device is incomplete and has low reliability may be determined. In a method for generating communication capability information provided in the embodiments of this application, the communication range of the roadside device can be conveniently and accurately obtained.

Figure 2:
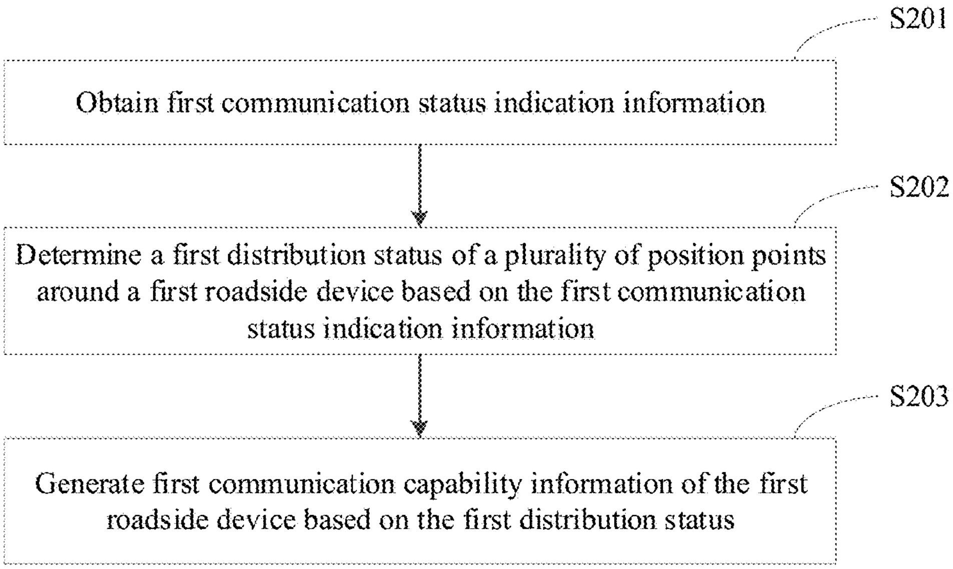
FIG. 2 is a flowchart of a method for generating communication capability information according to an embodiment of this application.

FIG. 2 is a flowchart of a method for generating communication capability information according to an embodiment of this application. As shown in FIG. 2, the method may include the following steps:

Step S201: Obtain first communication status indication information.

Step S202: Determine a first distribution status of a plurality of position points around a first roadside device based on the first communication status indication information.

Step S203: Generate first communication capability information of the first roadside device based on the first distribution status.

The first roadside device represents a roadside device whose communication capability needs to be determined. The first roadside device may be any roadside device. The first communication capability information may represent communication capability information of the first roadside device. The first communication capability information may be used to indicate a communication capability of the first roadside device, for example, a region in which the first roadside device can perform communication and a region in which the first roadside device cannot perform communication.

The first communication status indication information may be used to indicate the plurality of terminal devices to establish a communication connection to the first roadside device at the plurality of position points. When a terminal device establishes a communication connection to the first roadside device at a position point, it indicates that the position point falls within a communication range of the first roadside device, and the communication capability of the first roadside device can reach the position point. Therefore, a region that can be reached by the communication capability of the first roadside device can be determined based on the distribution status of the plurality of position points of the plurality of terminal devices that establish a communication connection to the first roadside device, to conveniently and accurately obtain a communication range of the first roadside device.

It may be understood that the plurality of position points that are of the plurality of terminal devices and that are indicated by the first communication status indication information may include position points of different terminal devices at a same moment, position points of a same terminal device at different moments, and position points of different terminal devices at different moments. For example, the plurality of position points of the plurality of terminal devices may include: a position point 1 of a vehicle 1 at 1 a.m. on Monday and a position point 2 of a vehicle 2 at 1 a.m. on Monday, the position point 1 of the vehicle 1 at 1 a.m. on Monday and a position point 3 of the vehicle 1 at 1 p.m. on Monday, and a position point 4 of a vehicle 3 at 1 a.m. on Tuesday and a position point 5 of a vehicle 4 at 1 p.m. on Tuesday. In other words, in this embodiment of this application, whether the plurality of position points indicated by the first communication status indication information are position points of a same terminal device and position points collected at a same moment is not limited.

In a possible implementation, the first communication status indication information may include: position information of the indicated plurality of position points, working status information of a plurality of communication modules in the indicated plurality of terminal devices, connection status information between the indicated plurality of terminal devices and the first roadside device, identifier information of the first roadside device, and time information. The position information of the position point, the working status information of the communication module, and the time information are described above, and details are not described herein again.

Connection status information between a terminal device and a roadside device may be a connected state or an unconnected state. The connected state indicates that the terminal device has established a communication connection to the roadside device, and the unconnected state indicates that the terminal device does not establish a communication connection to the roadside device. Because the first communication status indication information indicates the plurality of terminal devices to establish a communication connection to the first roadside device at the plurality of position points, the connection status information that is between the plurality of terminal devices and the first roadside device and that is in the first communication status indication information is a connected state.

The identifier information of the roadside device may be used to identify different roadside devices. For example, the identifier information of the roadside device may be a name, a number, and position information of the roadside device, an identifier of a communication module configured in the roadside device, another user-defined identifier, or the like. Therefore, the identifier information of the first roadside device may be a name or a number of the first roadside device, an identifier RSU_ID of an RSU in the first roadside device, another identifier defined by a user for the first roadside device, or the like.

The following describes a process of obtaining the first communication status indication information.

Figure 3:
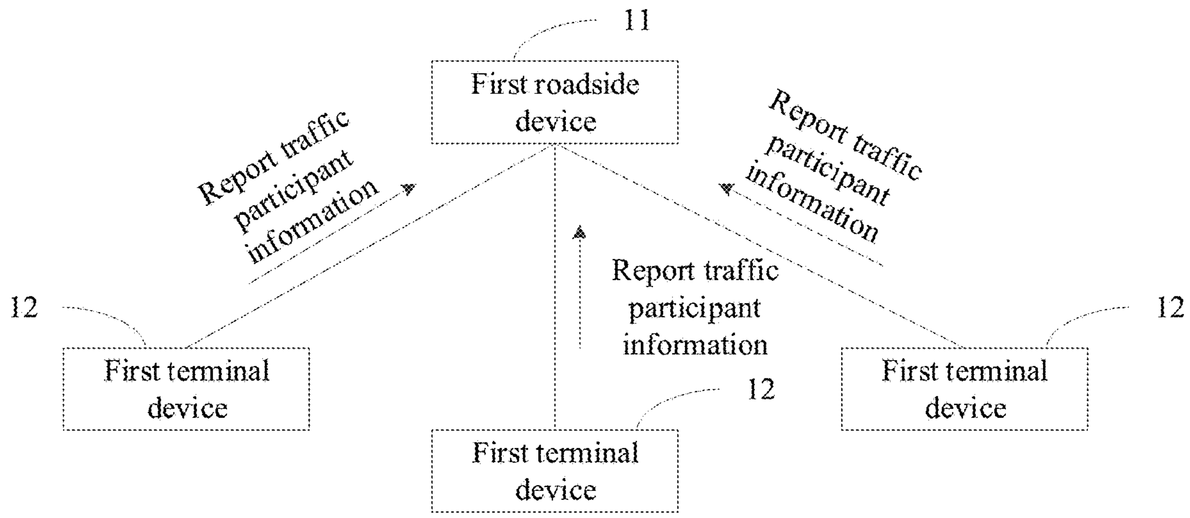
FIG. 3 is a schematic diagram of a structure of a communication system according to an embodiment of this application.

FIG. 3 is a schematic diagram of a structure of a communication system according to an embodiment of this application. As shown in FIG. 3, the communication system includes a first roadside device 11 and a first terminal device 12. The first roadside device 11 may represent any roadside device, and the first terminal device 12 represents a terminal device that establishes a communication connection to the first roadside device 11. The first terminal device 12 includes but is not limited to devices such as a vehicle-end device and a mobile terminal. The first roadside device 11 may be connected to one or more first terminal devices 12. Further, the first roadside device 11 may establish a communication connection to the first terminal device 12 by using a communication module in the first terminal device 12. After obtaining traffic participant data of the first terminal device 12, the first terminal device 12 may report the obtained traffic participant data to the first roadside device 11.

In a possible implementation, traffic participant data of a terminal device may include position information of a position point at which the terminal device is located when the traffic participant data is collected, time information about collecting the traffic participant data, working status information of a communication module in the terminal device, and identifier information of a roadside device connected to the terminal device. In an example, the position information may be denoted as Position, the working status information may be denoted as Connection, the identifier information of the roadside device may be denoted as RSU_ID, and the time information may be denoted as Time. In this case, traffic participant data of a terminal device may be denoted as (Position, Device, Connection, RSU_ID, Time). Because the first terminal device 12 is a terminal device that establishes a communication connection to the first roadside device 11, in the traffic participant data of the first terminal device 12, working status information of a communication module is "a normal working state", and identifier information of a roadside device includes "identifier information of the first roadside device 11". After receiving the traffic participant data reported by each first terminal device 12, the first roadside device 11 may generate the first communication status indication information based on the received information.

It should be noted that, it can be learned from FIG. 3 that a first terminal device 12 that establishes a communication connection to the first roadside device 11 may directly report traffic participant data to the first roadside device 11. Another terminal device that does not establish a communication connection to the first roadside device 11 cannot directly report traffic participant data thereof to the first roadside device 11 (a case in which forwarding is performed by using another roadside device is not considered herein, and even if the first roadside device receives traffic participant data forwarded by the another roadside device, the traffic participant data that has established a communication connection to the first roadside device 11 may be obtained through screening based on identifier information of a roadside device in the traffic participant data). Therefore, traffic participant data collected by the first roadside device 11 is from the first terminal device 12 that establishes a communication connection to the first roadside device 11.

After obtaining the first communication status indication information, the first roadside device may perform step S202 to obtain the first distribution status. In an example, the first roadside device may determine the first distribution status based on position information of a first position point (namely, a position point that is of the first terminal device and that is indicated by the first communication status indication information).

Figure 4:
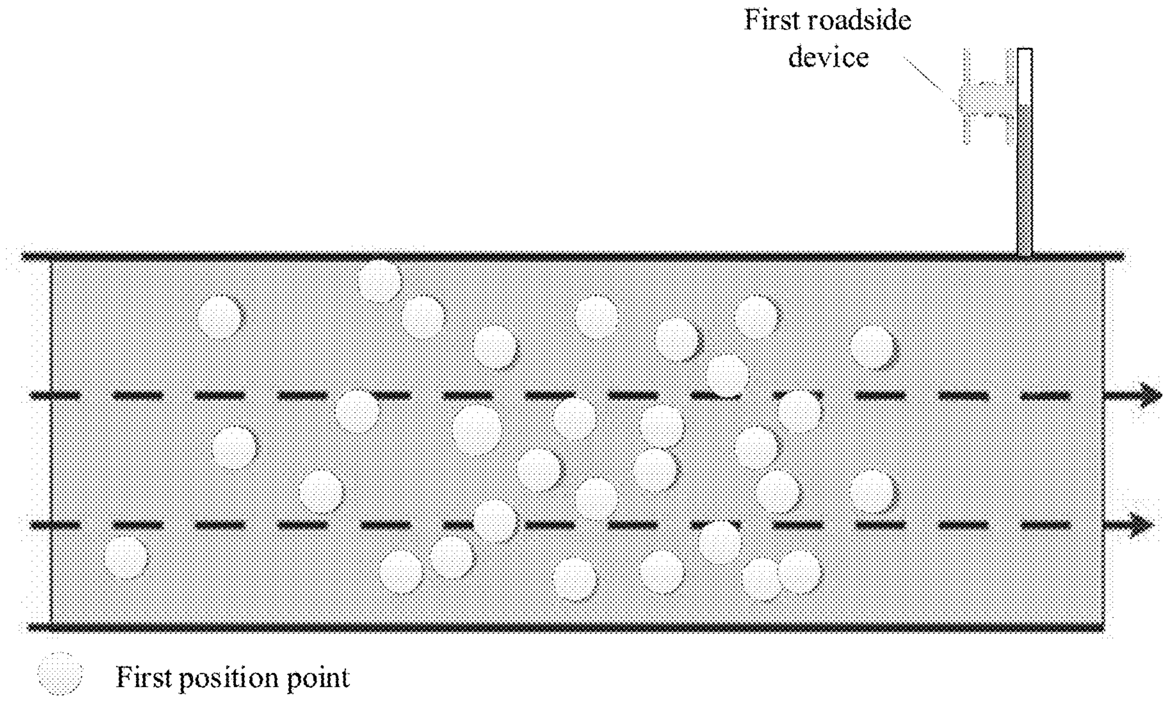
FIG. 4 is an example schematic diagram of a first distribution status.

FIG. 4 is an example schematic diagram of a first distribution status. As shown in FIG. 4, the first terminal device (namely, a terminal device that establishes a communication connection to the first roadside device) establishes a communication connection to the first roadside device at a plurality of position points, and position information of these position points is the first distribution status. It can be learned from FIG. 4 that, in a region close to the first roadside device, there are a large quantity of position points at which a communication connection can be established to the first roadside device, and in a region far away from the first roadside device, there are a small quantity of position points at which a communication connection can be established to the first roadside device.

Then, the first roadside device 11 may perform step S203 to obtain the first communication capability information.

Figure 5:
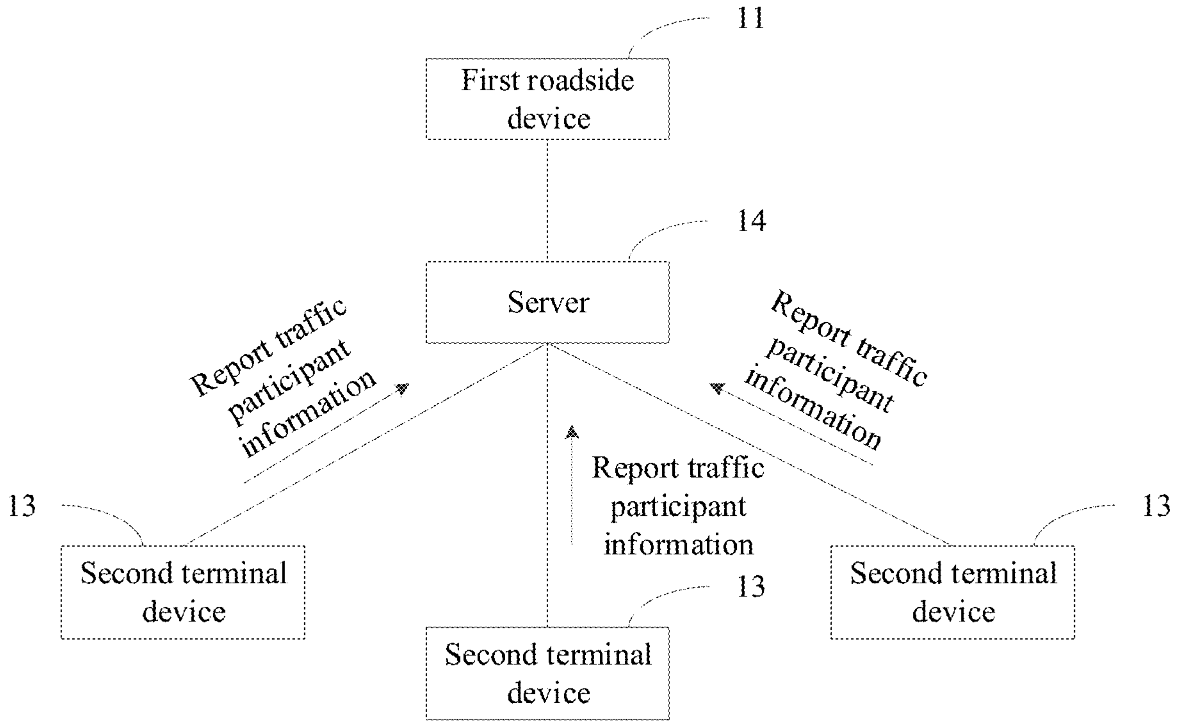
FIG. 5 is a schematic diagram of a structure of a communication system according to an embodiment of this application.

FIG. 5 is a schematic diagram of a structure of a communication system according to an embodiment of this application. As shown in FIG. 5, the communication system includes a first roadside device 11, a second terminal device 13, and a server 14. The first roadside device 11 may be any roadside device. The second terminal device 13 may represent a terminal device that establishes a communication connection to the server 14. Both the first roadside device 11 and the second terminal device 13 may establish a communication connection to the server 14 by using a cellular network. After obtaining traffic participant data of the second terminal device 13, the second terminal device 13 may report the obtained traffic participant data to the server 14. Considering that the second terminal device 13 may include the first terminal device 12 that establishes a communication connection to the first roadside device 11, that is, some second terminal devices 13 may establish both a communication connection to the server 14 and a communication connection to the first roadside device 11. Therefore, after receiving the traffic participant data reported by each second terminal device 13, the server 14 may obtain, through screening based on working status information and identifier information of a roadside device in the traffic participant data, traffic participant data that establishes a communication connection to the first roadside device. Further, the server 14 may obtain, by screening the received traffic participant data, traffic participant data in which working status information of a communication module is a "normal working state" and identifier information of a roadside device includes "identifier information of the first roadside device 11", and generate the first communication status indication information based on the traffic participant data obtained through screening.

In a possible implementation, after generating the first communication status indication information, the server 14 may perform step S202 to obtain the first distribution status, or send the first communication status indication information to the first roadside device 11, so that the first roadside device 11 performs step S202 to obtain the first distribution status.

In a possible implementation, in a process in which the server 14 generates the first communication status indication information and in a process in which the server 14 screens the traffic participant data, the server 14 may first find, from the collected traffic participant data, traffic participant data that falls within a preselection range of the first roadside device, and then obtain, by screening the traffic participant data in the preselection range, traffic participant data in which working status information is a "normal working state". For ease of description, in this embodiment of this application, a dataset including the traffic participant data obtained through screening at this point is referred to as a dataset A. Then, the server 14 may obtain, by screening the dataset A, traffic participant data in which identifier information of a roadside device includes "identifier information of the first roadside device 11". In this embodiment of this application, a dataset including the traffic participant data obtained through screening at this point is referred to as a dataset B. A dataset including traffic participant data other than the traffic participant data in the dataset B in the dataset A is referred to as a dataset C. The preselection range is a region around the first roadside device 11. The preselection range may be determined based on a communication range factory indicator of the first roadside device 11 and a mounting direction of the first roadside device. For example, the preselection range may be obtained by reserving a margin (for example, expanding 3 meters or 5 meters) in the mounting direction based on the communication range factory indicator of the first roadside device.

Figure 6:
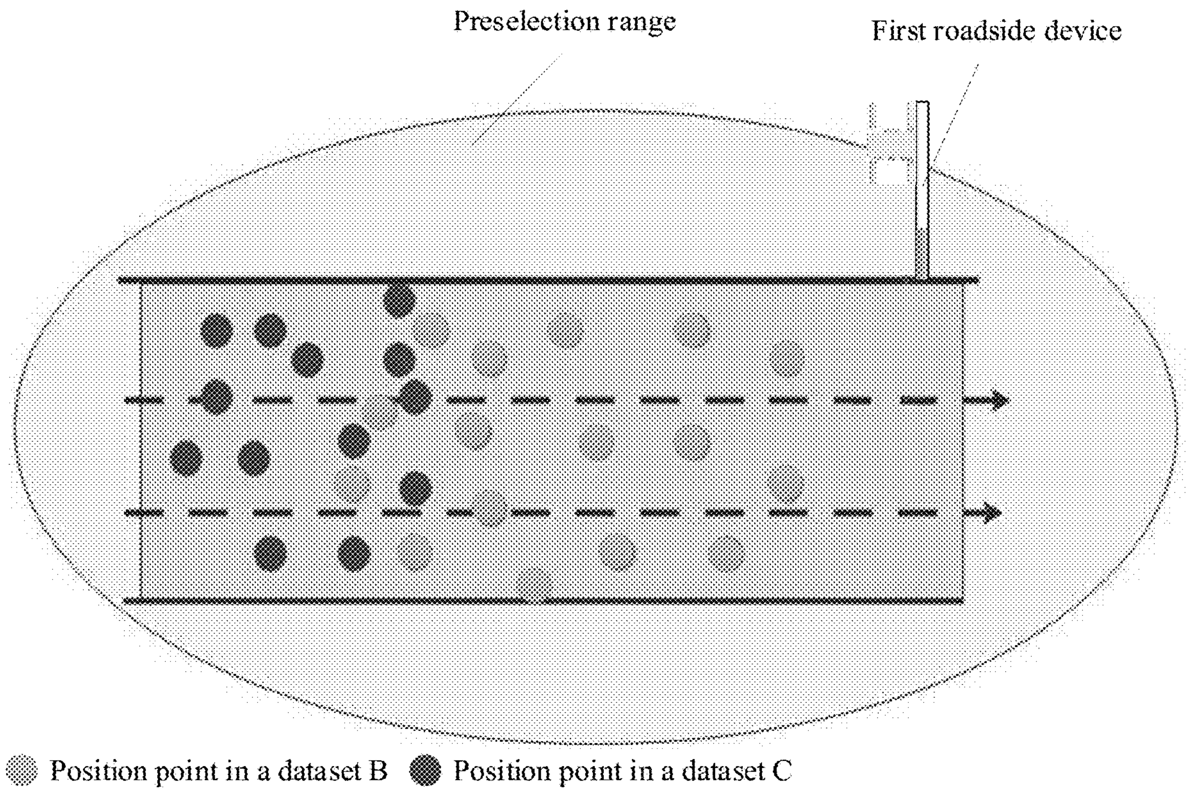
FIG. 6 is a schematic diagram of a distribution status of a terminal device.

FIG. 6 is a schematic diagram of a distribution status of a terminal device. As shown in FIG. 6, position points of a plurality of terminal devices are shown in the preselection range. At some position points, the terminal device can establish a communication connection to the first roadside device, and at some position points, the terminal device cannot establish a communication connection to the first roadside device. Traffic participant data corresponding to these position points at which a communication connection can be established to the first roadside device is in the dataset B, and traffic participant data corresponding to these position points at which a communication connection is not established to the first roadside device is in the dataset C. Position information of position points in the dataset B shown in FIG. 6 is the first distribution status. It can be learned from FIG. 6 that, in a region close to the first roadside device, there are a large quantity of position points at which a communication connection can be established to the first roadside device, and in a region far away from the first roadside device, there are a small quantity of position points at which a communication connection can be established to the first roadside device.

Then, the server 14 or the first roadside device 11 may perform step S203 to obtain the first communication capability information.

The following describes a process of generating the first communication capability information based on the first distribution status in step S203. It can be learned from FIG. 3 and FIG. 5 that step S203 may be performed by the first roadside device, or may be performed by the server. The following is described by using an example in which the first roadside device performs step S203. For a process in which the server performs step S203, refer to the process in which the first roadside device performs step S203. Details are not described again in this embodiment of this application.

In a possible implementation, step S203 may include: The first roadside device directly generates the first communication capability information based on the first distribution status. The first distribution status may be a density of the first position point, and the first position point represents a position point of the first terminal device. In a region in which the density of the first position point is large, the communication capability of the first roadside device is strong, and in a region in which the density of the first position point is small, the communication capability of the first roadside device is weak. Therefore, the first roadside device may generate the first communication capability information based on the density of the first position point.

In a possible implementation, the first roadside device may obtain second communication status indication information, determine a second distribution status based on the second status indication information, and then generate the first communication capability information based on the first distribution status and the second distribution status in step S203.

The second communication status indication information is used to indicate a first at least one first terminal device (for ease of description, the first at least one terminal device is referred to as at least one third terminal device in this embodiment of this application) to establish a communication connection to a second roadside device at a first at least one position point (for ease of description, the first at least one position point is referred to as at least one third position point in this embodiment of this application), and a distance between the at least one third position point and the first roadside device is less than a preset threshold. For a process of obtaining the second communication status indication information, refer to the process of obtaining the first communication status indication information. The first roadside device in the process of obtaining the first communication status indication information is replaced with the second roadside device, and the position information in the traffic participant information is limited to a range in which a distance from the first roadside device is less than the preset threshold. The preset threshold may be set based on a requirement. For example, the preset threshold may be 100 meters, 200 meters, 500 meters, 1000 meters, or the like. In an example, the first roadside device may determine the second distribution status based on position information of the third position point (namely, the position point indicated by the second communication status indication information). For the second distribution status, refer to the position information of the position point in the dataset B and the position information of the position point in the dataset C in FIG. 6.

If a terminal device establishes a communication connection to the second roadside device at a position point whose distance from the first roadside device is less than the preset threshold, it indicates that working status information of a communication module in the terminal device is a "normal working state", and the terminal device is located around the first roadside device. In this case, the terminal device is the foregoing third terminal device, and the position point is the foregoing third position point. A third terminal device may establish a communication connection to the first roadside device at a third position point (for example, the position point in the dataset B shown in FIG. 6), or may not establish a communication connection to the first roadside device at a third position point (for example, the position point in the dataset C shown in FIG. 6). In this embodiment of this application, the second distribution status may be used as a comparison object of the first distribution status, the second distribution status is used to reflect a position point that actually exists around the first roadside device and at which a communication connection can be established to the first roadside device, and the first distribution status is used to reflect a position point at which the first roadside device actually establishes a communication connection. In this embodiment of this application, a stable connection rate may be determined based on the first distribution status and the second distribution status. The stable connection rate may be a ratio of a quantity of first position points to a quantity of third position points. It may be understood that, when the stable connection rate is large, it indicates that a quantity of position points at which the first roadside device actually establishes a communication connection is close to a quantity of position points that actually exist around the first roadside device and at which a communication connection can be established to the first roadside device, and the communication capability of the first roadside device is good. When the stable connection rate is small, it indicates that a difference between a quantity of position points at which the first roadside device actually establishes a communication connection and a quantity of position points that actually exist around the first roadside device and at which a communication connection can be established to the first roadside device is large, and the communication capability of the first roadside device is poor. Therefore, the first roadside device may generate the first communication capability information based on the stable connection rate.

In a possible implementation, the first roadside device may obtain third communication status indication information, then determine a third distribution status based on the third communication status indication information, and then generate the first communication capability information based on the first distribution status and the third distribution status in step S203.

The third communication status indication information is used to indicate a second at least one terminal device (for ease of description, the second at least one terminal device is referred to as at least one second terminal device in this embodiment of this application) to establish a communication connection to the server at a second at least one position point (for ease of description, the second at least one position point is referred to as at least one second position point in this embodiment of this application), the second at least one terminal device has a capability of connecting to the first roadside device, and a distance between the second at least one position point and the first roadside device is less than a preset threshold. For a process of obtaining the third communication status indication information, refer to FIG. 5, and the third communication status indication information is obtained by the server by screening received traffic participant information. Further, the server may obtain, by screening the received traffic participant information, traffic participant data in which position information is that the distance from the first roadside device is less than the preset threshold and in which working status information of a communication module is a "normal working state", and then obtain the third communication status indication information based on the traffic participant data obtained through screening. In an example, the first roadside device may determine the third distribution status based on position information of the second position point (namely, the position point indicated by the third communication status indication information). For the third distribution status, refer to the position information of the position point in the dataset B and the position information of the position point in the dataset C in FIG. 6.

If a terminal device establishes a communication connection to the server at a position point whose distance from the first roadside device is less than the preset threshold, and working status information of a communication module in the terminal device is a "normal working state", it indicates that the terminal device is near the first roadside device and has a capability of connecting to the first roadside device. In this case, the terminal device is the foregoing second terminal device, and the position point is the foregoing second position point. If the first roadside device does not establish a communication connection to the third terminal device, it indicates that a communication capability of the first roadside device at a corresponding second position point is poor. If the first roadside device establishes a communication connection to the third terminal device, it indicates that a communication capability of the first roadside device at a corresponding third position point is strong. Therefore, in this embodiment of this application, the third distribution status may be used as a comparison object of the first distribution status, the third distribution status is used to reflect a position point that actually exists around the first roadside device and at which a communication connection can be established to the first roadside device, and the first distribution status is used to reflect a position point at which the first roadside device actually establishes a communication connection. In this embodiment of this application, a stable connection rate may be determined based on the first distribution status and the third distribution status. The stable connection rate may be a ratio of a quantity of first position points to a quantity of second position points. It may be understood that, when the stable connection rate is large, it indicates that a quantity of position points at which the first roadside device actually establishes a communication connection is close to a quantity of position points that actually exist around the first roadside device and at which a communication connection can be established to the first roadside device, and the communication capability of the first roadside device is good. When the stable connection rate is small, it indicates that a difference between a quantity of position points at which the first roadside device actually establishes a communication connection and a quantity of position points that actually exist around the first roadside device and at which a communication connection can be established to the first roadside device is large, and the communication capability of the first roadside device is poor. Therefore, the first roadside device may generate the first communication capability information based on the stable connection rate.

In a possible implementation, step S203 may include determining a plurality of grids based on a preselection range of the first roadside device; combining grids whose grid indicators meet a first condition and that are in the plurality of grids, to obtain a combined grid, and continuing to combine grids whose grid indicators meet the first condition and that are in existing grids, until no grid that meets the first condition exists; for any grid, determining the grid as a communication region, and determining a communication capability level of the grid based on an indicator range to which a grid indicator of the grid belongs; and determining the first communication capability information based on position information and a communication capability level of each grid.

In an example, determining a plurality of grids based on a preselection range of the first roadside device may include performing grid processing on the preselection range of the first roadside device to obtain the plurality of grids. In another example, the determining a plurality of grids based on a preselection range of the first roadside device may include: obtaining an intersection set of the preselection range of the first roadside device and a first road, to obtain a to-be-divided region; and performing grid processing on the to-be-divided region to obtain the plurality of grids. The first road may represent a road on which the first roadside device is located or a road around the first roadside device. An association relationship between the first road and the first roadside device may be preset when the first roadside device is deployed.

The grid indicator is a density of the first position point in the grid or a stable connection rate of the grid. The corresponding first condition is that a density difference is less than a first preset threshold or a stable connection rate difference is less than a second preset threshold. The first preset threshold and the second preset threshold may be set based on a requirement. For example, the first preset threshold may be 0.2 first position point per square meter, and the second preset threshold may be 0.1. The first preset threshold and the second preset threshold are not limited in this embodiment of this application.

Figure 7:
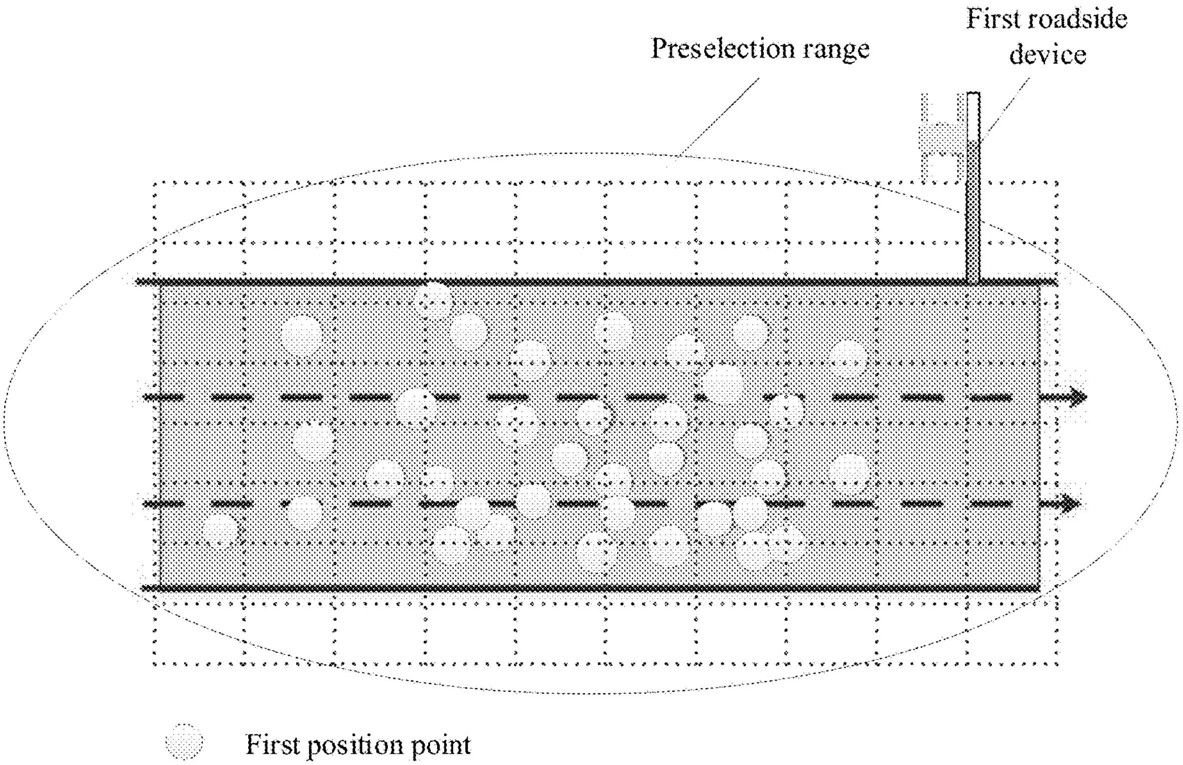
FIG. 7 is an example schematic diagram of a grid according to an embodiment of this application.

FIG. 7 is an example schematic diagram of a grid according to an embodiment of this application. As shown in FIG. 7, based on the first distribution status shown in FIG. 4, the preselection range of the first roadside device is divided into a plurality of grids. In an example, the to-be-divided region is evenly divided into a plurality of grids (as shown in FIG. 7). In this way, statistics management is facilitated. Certainly, the to-be-divided region may be divided into a plurality of grids in another manner. For example, an area of a grid obtained by dividing a region whose distance from the first roadside device is short is less than an area of a grid obtained by dividing a region whose distance from the first roadside device is long (not shown). In this way, a quantity of calculation times and a quantity of combination times can be reduced.

After the grid is obtained through division, the density of the first position point in each grid may be determined as a grid indicator of each grid. After the grid indicator of each grid is determined, grids whose grid indicators meet the first condition and that are in the plurality of grids may be combined, to obtain a combined grid.

Figure 8:
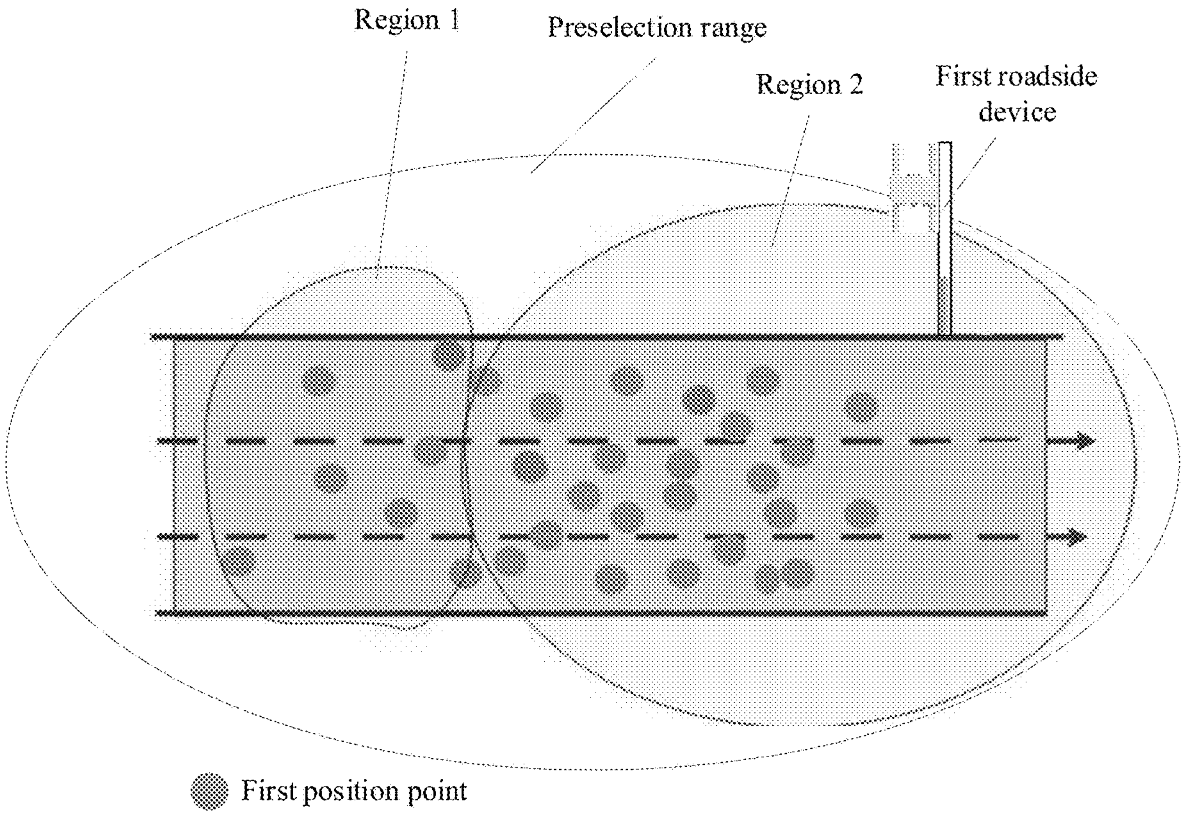
FIG. 8 is an example schematic diagram of a grid combination result according to an embodiment of this application.

Then, a grid indicator of each grid obtained after a previous round of combination is determined, and grids whose grid indicators meet the first condition and that are in existing grids continue to be combined, until no grid that meets the first condition exists. FIG. 8 is an example schematic diagram of a grid combination result according to an embodiment of this application. As shown in FIG. 8, the grids shown in FIG. 7 are finally combined to obtain a region 1 and a region 2. A density of the first position point in the region 1 is small, and a density of the first position point in the region 2 is large. It can be learned that the first roadside device has a communication capability in the region 1, but the communication capability is poor, and has a communication capability in the region 2, and the communication capability is strong.

Figure 9:
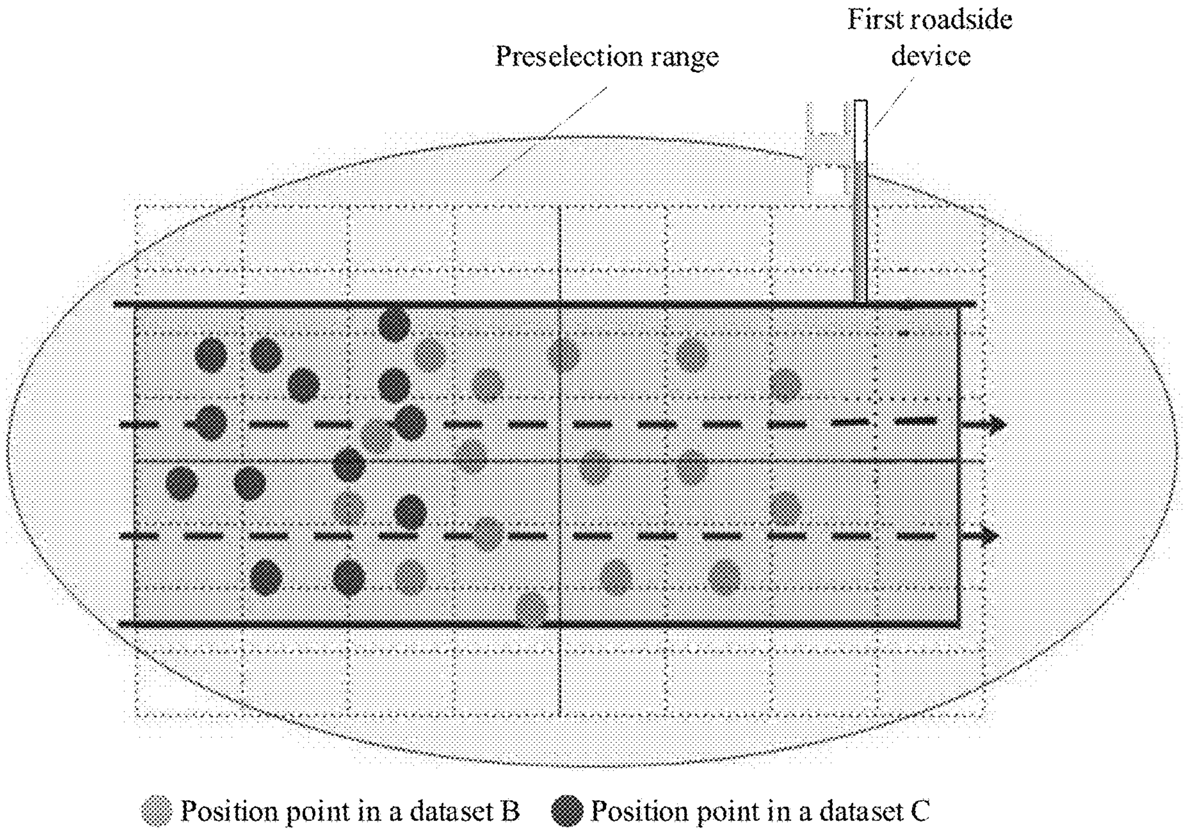
FIG. 9 is an example schematic diagram of a grid according to an embodiment of this application.
Figure 10:
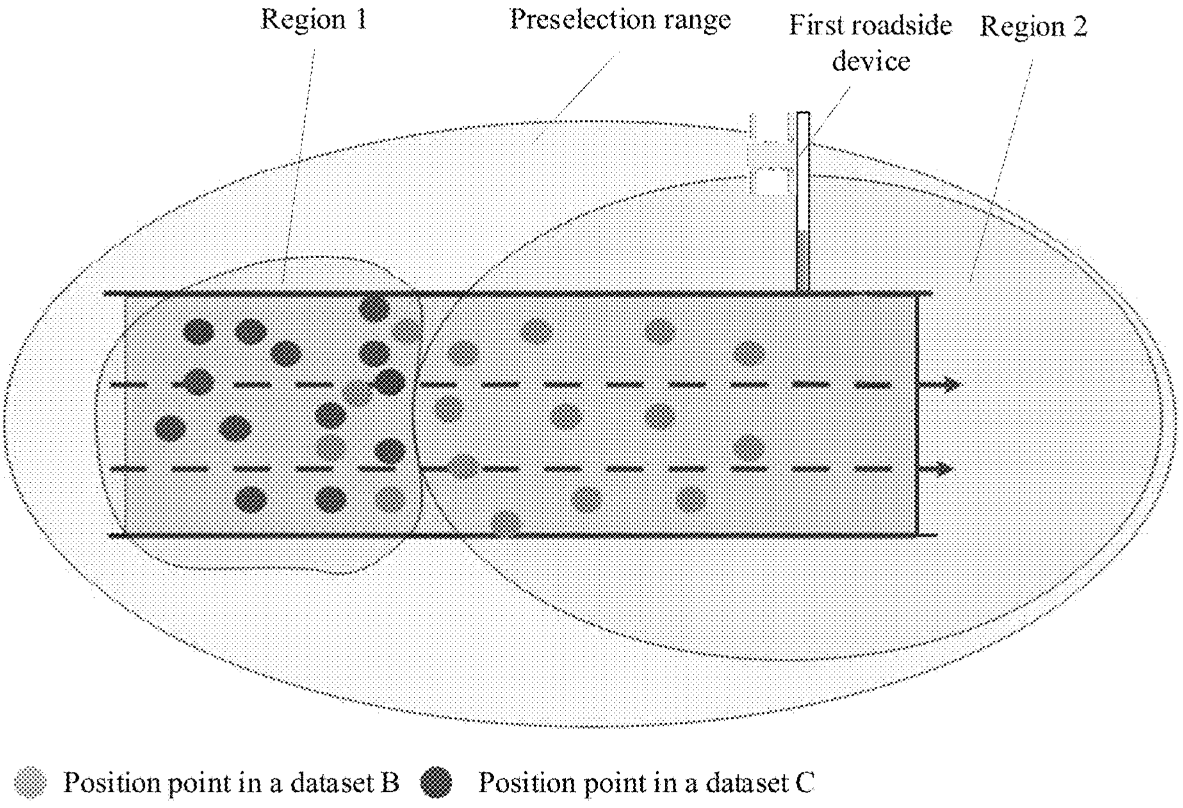
FIG. 10 is an example schematic diagram of a grid combination result according to an embodiment of this application.

FIG. 9 is an example schematic diagram of a grid according to an embodiment of this application. As shown in FIG. 9, based on the distribution status of the terminal device shown in FIG. 6, the preselection range of the first roadside device is divided into a plurality of grids. After the grid is obtained through division, a stable connection rate of each grid may be determined as a grid indicator of each grid. After the grid indicator of each grid is determined, grids whose grid indicators meet the first condition and that are in the plurality of grids may be combined, to obtain a combined grid. Then, a grid indicator of each grid obtained after a previous round of combination is determined, and grids whose grid indicators meet the first condition and that are in existing grids continue to be combined, until no grid that meets the first condition exists. FIG. 10 is an example schematic diagram of a grid combination result according to an embodiment of this application. As shown in FIG. 10, the grids shown in FIG. 9 are finally combined to obtain a region 1 and a region 2. A stable connection rate of the region 1 is small, and a stable connection rate of the region 2 is large. It can be learned that the first roadside device has a communication capability in the region 1, but the communication capability is poor, and has a communication capability in the region 2, and the communication capability is strong.

When no grid that meets the first condition exists, that is, when grids cannot be further combined, for any grid, the grid is determined as a communication region, a communication capability level of the communication region is determined based on an indicator range to which a grid indicator of the communication region belongs, and communication capability information of the first roadside device may be determined based on position information and a communication capability level of each communication region.

In this embodiment of this application, each indicator range corresponds to one communication capability level. The determining a communication capability level of the communication region based on an indicator range to which a grid indicator of the communication region belongs includes: when the grid indicator of the communication region belongs to a first indicator range, determining that the communication capability level of the communication region is a first communication capability level. The first indicator range is any one of the indicator ranges, and the first communication capability level is a communication capability level corresponding to the first indicator range. FIG. 8 and FIG. 10 are used as an example. There are two communication regions: a region 1 and a region 2. A grid indicator of the region 1 belongs to an indicator range 1, and a grid indicator of the region 2 belongs to an indicator range 2. In this case, it may be determined that a communication capability level of the first roadside device in the region 1 is a level 1, and a communication capability level of the first roadside device in the region 2 is a level 2.

In an example, that the grid indicator of the communication region belongs to a first indicator range may include: a density falls within a first range, and/or a stable connection rate falls within a second range. The first range and the second range may be set based on a requirement. This is not limited in this embodiment of this application.

In an example, the communication capability level may include a blind area, a weak communication capability, an ordinary communication capability, and a strong communication capability. In another example, the communication capability level may include a low level, a medium level, and a high level. In another example, the communication capability level may include a first level, a second level, a third level, a fourth level, and the like. It may be understood that the foregoing descriptions are merely an example of the communication capability level, and a division manner and a division quantity of the communication capability level are not limited in this embodiment of this application.

In a possible implementation, the first communication capability information may be used to indicate a communication capability of the first roadside device. For example, the first communication capability information may indicate a region in which the first roadside device can perform communication and a region in which the first roadside device cannot perform communication. For example, the first roadside device may communicate with a terminal device in a region within 200 meters, and cannot communicate with a terminal device in a region beyond 200 meters.

In a possible implementation, the first communication capability information may be used to indicate a first region and a communication capability of the first roadside device in the first region.

The first region may represent any region. In an example, the first region may be a first region on the first road. The first region may be a rectangle, a sector, an ellipse, or another shape. A shape and an area of the first region are not limited in this embodiment of this application. For example, a communication effect of the first roadside device in a region within 100 meters is good, that is, the communication capability is a strong communication capability; a communication effect of the first roadside device in a region from 100 meters to 150 meters is ordinary, that is, the communication capability is a medium communication capability; a communication effect of the first roadside device in a region from 150 meters to 200 meters is poor, that is, the communication capability is a weak communication capability; and the first roadside device cannot perform communication in a region beyond 200 meters, that is, the communication capability is that communication cannot be performed.

In a possible implementation, the first communication capability information may be used to indicate a first scenario, a first region, and a communication capability of the first roadside device in the first scenario and the first region.

The "scenario" in this embodiment of this application is used to identify an environment (for example, an environment in which the first roadside device is located) in which a device having a communication function is located, or identify an environment (for example, an environment in which a vehicle or a pedestrian is located) in which a communication object of a device having a communication function is located. The first scenario may represent any scenario. For example, the first scenario includes but is not limited to scenarios that affect a communication capability, such as daytime, night, a sunny day, a cloudy day, a sandy day, a rainy and snowy day, and a foggy day. It may be understood that a communication range of the first roadside device on the sunny day is greater than a communication range on the cloudy day, the sandy day, the rainy and snowy day, and the foggy day. The communication range of the first roadside device varies with a size of sand, intensity of rain and snow, or a fog level. In the daytime, a traffic volume is large and a communication range may be small. In the night, a traffic volume is small and a communication range may be large. Therefore, in this embodiment of this application, the communication capability of the first roadside device may be described based on a scenario, so that accuracy of the communication capability of the first roadside device is higher. For example, in a sunny day scenario, the communication capability of the first roadside device in the region 1 shown in FIG. 10 is a medium communication capability, and the communication capability of the first roadside device in the region 2 shown in FIG. 10 is a strong communication capability. In a foggy day scenario, the communication capability of the first roadside device in the region 1 shown in FIG. 10 is a weak communication capability, and the communication capability of the first roadside device in the region 2 shown in FIG. 10 is a medium communication capability.

It should be noted that, when the first communication capability information indicates the first scenario, the first region, and the communication capability of the first roadside device in the first scenario and the first region, a scenario label may be added to the foregoing traffic participant data. In this way, the first communication status indication information, the second communication status indication information, and the third communication status indication information in the first scenario may be obtained. If no scenario label is added to the foregoing traffic participant data, before traffic participant data in the first scenario is obtained, the traffic participant data in the first scenario may be obtained based on third-party information (for example, time information and historical weather information).

At this point, the first communication capability information of the first roadside device is obtained. In this application, for a manner of obtaining communication capability information by another roadside device, refer to the manner of obtaining the first communication capability information of the first roadside device. Details are not described herein again. For example, for a manner of obtaining second communication capability information of the second roadside device, refer to the manner of obtaining the first communication capability information of the first roadside device.

In a possible implementation, the first communication capability information of the first roadside device may be associated with an identifier of a road. In this way, before a route is planned or a traffic participant plans to include a road or a road segment, communication capability information of each roadside device on the road or the road segment may be retrieved, to determine a roadside communication capability of each region on the road or the road segment, thereby helping improve safety.

In a possible implementation, the first communication capability information may be stored as map data. In this way, when performing intelligent driving, a vehicle may obtain the first communication capability information from a map, to determine whether a driver needs to take over the vehicle when the vehicle travels to a region, whether confidence of information from the first roadside device needs to be reduced in a region, or whether a region needs to be avoided during route planning, thereby improving safety. It may be understood that the first communication capability information may be associated with the first roadside device and then stored as map data. The communication capability information of the other roadside device (for example, the second communication capability information of the second roadside device) may also be stored as map data, to improve safety.

The following describes application of communication capability information.

Considering that a communication blind area may still exist in case of a plurality of roadside devices due to factors such as an obstruction on a road, in this embodiment of this application, the communication capability information of all the roadside devices may be integrated to form an overall communication coverage capability. In a possible implementation, the method further includes: generating a plurality of pieces of communication capability information of a plurality of roadside devices; and generating communication blind area information based on the plurality of pieces of communication capability information.

The plurality of pieces of communication capability information are used to indicate communication capabilities of the plurality of roadside devices. Further, the plurality of roadside devices includes the first roadside device, and the plurality of pieces of communication capability information include the first communication capability information. In addition, the plurality of roadside devices may further include one or more second roadside devices. In this case, the plurality of pieces of communication capability information may include one or more pieces of second communication capability information.

The communication blind area information is used to indicate a region that is not covered by one or more of the pluralities of roadside devices. In an example, the region that is not covered by one or more of the pluralities of roadside devices include an absolute blind area and/or a relative blind area, any one of the plurality of roadside devices cannot reach a second threshold in the absolute blind area, and some of the plurality of roadside devices cannot reach a third threshold in the relative blind area.

The second threshold and the third threshold may be set based on a requirement. The second threshold and the third threshold are not limited in this embodiment of this application. The second threshold and the third threshold may be used to indicate an expected or acceptable communication effect. When a roadside device cannot reach the second threshold or the third threshold, it indicates that a communication effect of the roadside device does not reach an expectation or is unacceptable. When a roadside device can reach the second threshold or the third threshold, it indicates that a communication effect of the roadside device can reach an expectation or is acceptable. In an example, the second threshold and the third threshold include but are not limited to: meeting a preset communication capability level (for example, a corresponding communication capability level is a level 1 or a level 2), or falling within a preset indicator range (for example, a density falls within the preset indicator range or a stable connection rate falls within the preset indicator range), or the like. When a roadside device does not reach the second threshold in a region, it indicates that a communication effect of the roadside device in the region is poor, and reliability and accuracy of information obtained by the roadside device through communication in the region are low (confidence is low and information is incomplete). Therefore, the region is a blind area of the roadside device. In this embodiment of this application, the second threshold and the third threshold may be the same or different. This is not limited herein.

Figure 11:
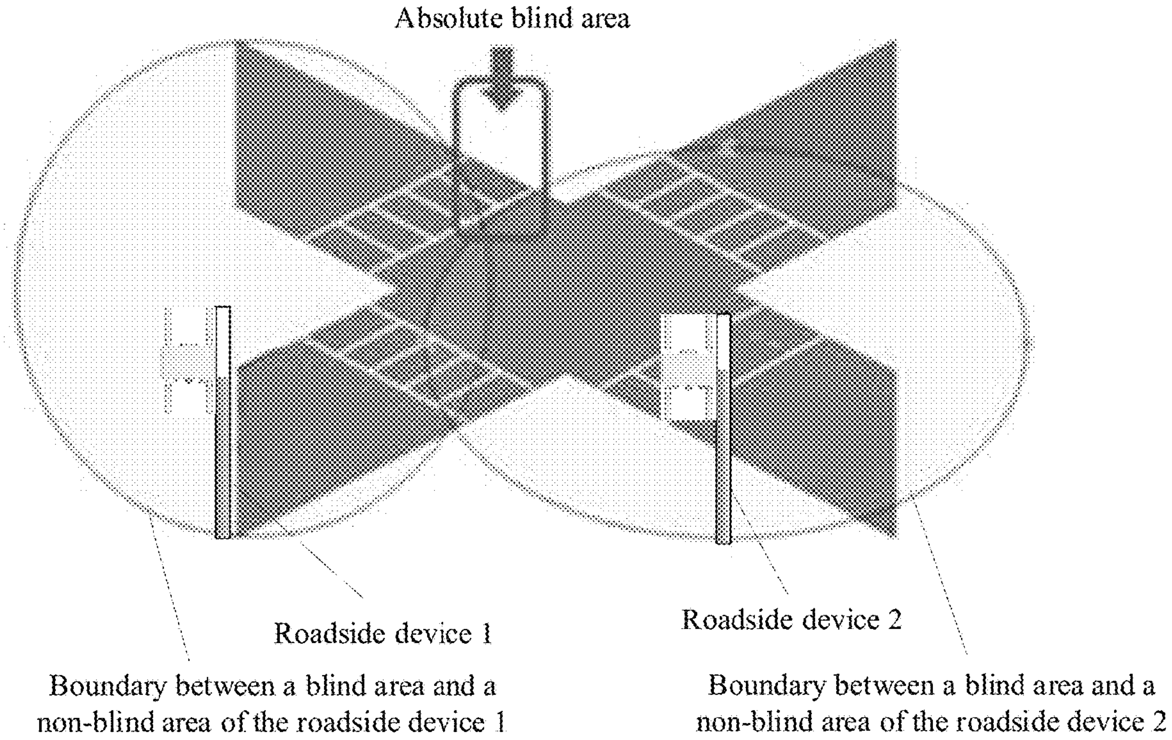
FIG. 11 is an example schematic diagram of a blind area according to an embodiment of this application.

FIG. 11 is an example schematic diagram of a blind area according to an embodiment of this application. FIG. 11 shows a boundary between a blind area and a non-blind area of a roadside device 1, and a boundary between a blind area and a non-blind area of a roadside device 2. A region within the boundary is a non-blind area, and a region outside the boundary is a blind area. An intersection set of the blind area of the roadside device 1 and the non-blind area of the roadside device 2 and an intersection set of the non-blind area of the roadside device 1 and the blind area of the roadside device 2 are relative blind areas. An intersection set of the blind area of the roadside device 1 and the blind area of the roadside device 2 is an absolute blind area.

The roadside device 1 and the roadside device 2 shown in FIG. 11 are used as an example. It is assumed that the second threshold and the third threshold are the same. A process of determining the relative blind area and the absolute blind area is described.

In a possible implementation, when a communication connection is established between the roadside device 1 and the roadside device 2, a communication capability of a region is determined based on a better communication capability in communication capabilities of the roadside device 1 and the roadside device 2. For a region, if neither the communication capability of the roadside device 1 nor the communication capability of the roadside device 2 reaches the second threshold, it may be determined that the region is an absolute blind area. In this case, the relative blind area may not be marked.

In a possible implementation, when no communication connection is established between the roadside device 1 and the roadside device 2, a region in which a communication capability of the roadside device 1 does not reach the second threshold but a communication capability of the roadside device 2 reaches the second threshold, and a region in which the communication capability of the roadside device 2 does not reach the second threshold but the communication capability of the roadside device I reaches the second threshold are determined as relative blind areas, and a region in which neither of the communication capabilities of the two roadside devices reaches the second threshold is determined as an absolute blind area.

In an example, different identifiers may be added for the absolute blind area and the relative blind area. For example, a first identifier is added for the absolute blind area, and a second identifier is added for the relative blind area. In this way, whether a blind area is an absolute blind area or a relative blind area can be determined based on the identifier. Optionally, when the relative blind area is identified, the relative blind area may be further associated with an identifier of a roadside device, to determine which roadside device a relative blind area belongs to.

In another example, communication capability information of a roadside device may be associated with a roadside device that establishes a communication connection to the roadside device. In this way, the user may determine a specific roadside device to which the roadside device establishes a communication connection, to determine the absolute blind area and the relative blind area.

In a possible implementation, the method further includes generating warning prompt information based on the first communication capability information. The warning prompt information may be used to give the following prompt: taking over a vehicle by a driver in a second region, performing fault detection on the first roadside device, updating software of the first roadside device or adjusting deployment of the first roadside device, reducing confidence of information from the first roadside device in the second region, or avoiding the second region during route planning, and the first communication capability information indicates that a communication capability of the first roadside device in the second region is lower than a first threshold.

The first communication capability information indicates that the communication capability of the first roadside device in the second region is lower than the first threshold. The first threshold may be set based on a requirement. In an example, that the communication capability of the first roadside device in the second region is lower than the first threshold may include but is not limited to one or more of the following: a preset communication capability level is not reached (for example, a level-1 communication capability level is not reached or a level-2 communication capability level is not reached), the density of the first position point does not reach a preset density threshold, or the stable connection rate does not reach a preset stability threshold. The density threshold and the stability threshold herein may be set based on a requirement. This is not limited in this embodiment of this application. Considering that the second threshold and the third threshold are used to determine the blind area, the first threshold is used for warning, and warning needs to be performed in a region that is not a blind area but has a poor communication effect, in an example, the first threshold may be greater than (higher than) or equal to the second threshold and the third threshold.

When the communication capability of the first roadside device in the second region is lower than the first threshold, it indicates that a communication effect of the first roadside device in the second region is poor, and the first roadside device cannot accurately and comprehensively communicate with a terminal device in the second region. Therefore, it cannot be ensured that the first roadside device can transmit, to each terminal device in the second region, information (including information sensed by the first roadside device and information collected from another device) obtained by the first roadside device. Therefore, when the vehicle in the second region performs self-driving, there may be insufficient data sources, and a risk is high. The driver may take over the vehicle in the second region. In addition, fault check may be performed on the first roadside device, to check whether a communication effect of the first roadside device in the second region is poor because the first roadside device is faulty, especially when the second region is close to the first roadside device. Alternatively, software of the first roadside device may be updated or deployment of the first roadside device may be adjusted such that a communication capability range of the first roadside device is more appropriate. In addition, because a communication effect of the first roadside device in the second region is poor, information that is about a terminal device in the second region and that is collected by the first roadside device cannot well represent an actual situation in the second region. Therefore, confidence of the information obtained by the first roadside device needs to be reduced in the second region. Because a communication effect of the first roadside device in the second region is poor, the second region may be avoided during route planning. In this way, a possibility that an accident occurs after the vehicle enters the second region can be reduced. Particularly, for a self-driving car, the self-driving car does not need to be taken over by the driver if the self-driving car travels by avoiding the second region, so that user experience can be effectively improved.

Figure 12:
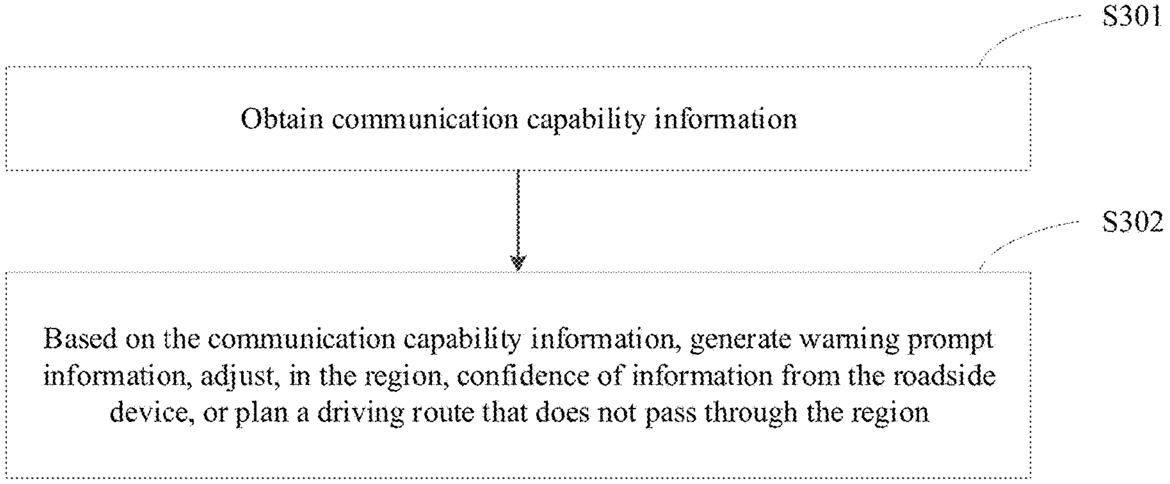
FIG. 12 is a flowchart of a method for using communication capability information according to an embodiment of this application.

In this embodiment of this application, the communication capability information of each roadside device may be further sent to another device for use by the other device, for example, may be provided for a vehicle-end device, a mobile terminal, or a management device of the roadside device. FIG. 12 is a flowchart of a method for using communication capability information according to an embodiment of this application. As shown in FIG. 12, the method for using communication capability information may include the following steps:

Step S301: Obtain communication capability information.

In this step, one or more pieces of communication capability information of one or more roadside devices may be obtained. For example, first communication capability information of a first roadside device may be obtained. For another example, first communication capability information of a first roadside device and one or more pieces of second communication capability information of one or more second roadside devices may be obtained. For a process of generating the second communication capability information, refer to the process of generating the first communication capability information. Details are not described herein again.

For any piece of obtained communication capability information, the communication capability information is used to indicate a region and a communication capability of a roadside device in the region. For example, the first communication capability information may be used to indicate a first region and a communication capability of the first roadside device in the first region. In a possible implementation, for any received communication capability information, the communication capability information may be used to indicate a region, a scenario, and a communication capability of a roadside device in the scenario and the region. For example, the first communication capability information may be used to indicate a communication capability of the first roadside device in a first scenario and a first region.

In a possible implementation, the communication capability information may be stored as map data. After downloading or updating a map, a device that uses communication capability information such as a vehicle-end device may obtain the communication capability information from the map.

Step S302: Based on the communication capability information, generate warning prompt information, adjust, in the region, confidence of information from the roadside device, or plan a driving route that does not pass through the region.

In this step, a communication capability of each roadside device in each region may be determined based on the received communication capability information, to learn of a specific region in which the roadside device has a strong capability of communicating with a terminal device and a specific region in which the roadside device has a poor capability of communicating with a terminal device, and generate the warning prompt information based on the communication capability, adjust, in the region, the confidence of the information from the roadside device, or plan the driving path that does not pass through the region.

In a possible implementation, the warning prompt information is used to give the following prompt: taking over a vehicle by a driver in the region, being careful to avoid a vehicle in the region, performing fault detection on the roadside device, reducing, in the region, confidence of information obtained by the roadside device through communication, or avoiding the region during route planning, and the communication capability information indicates that the communication capability of the roadside device in the region is lower than a first threshold.

It may be understood that, for different devices, different actions are performed based on communication capability information of the devices, and for a same device, different actions may be performed based on communication capability information of the device. The following describes step S302 with reference to FIG. 13 to FIG. 15.

Figure 13:
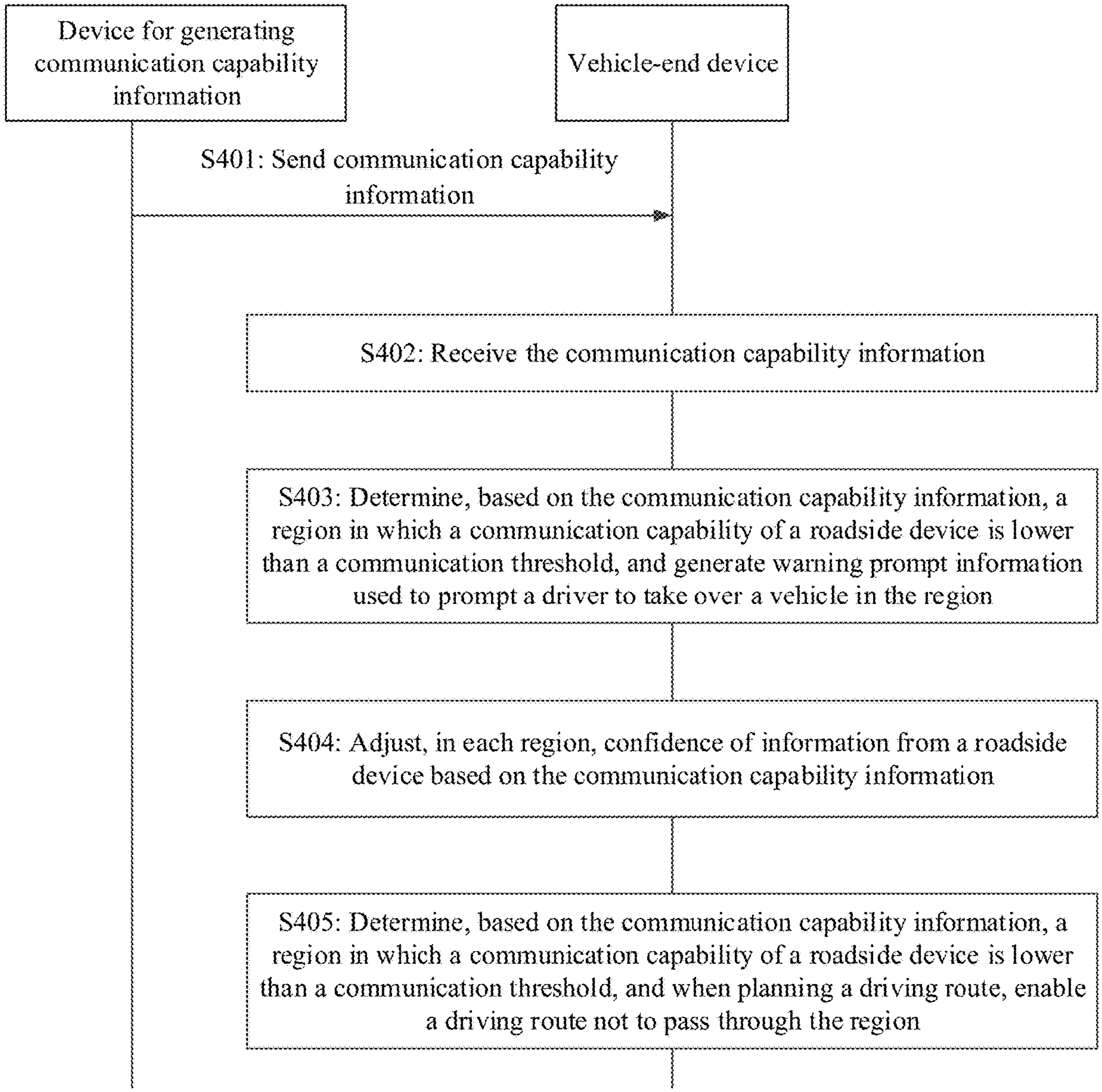
FIG. 13 is a schematic interaction diagram of a method for using communication capability information according to an embodiment of this application.

FIG. 13 is a schematic interaction diagram of a method for using communication capability information according to an embodiment of this application. As shown in FIG. 13, the method for using communication capability information may include the following steps:

Step S401: A device for generating communication capability information sends communication capability information to a vehicle-end device.

In this embodiment of this application, the communication capability information may be generated by a server or a roadside device. The device for generating communication capability information may be a roadside device, or may be a server, or may be a roadside device and a server. When the communication capability information is generated by the server, the server may directly send the communication capability information to the vehicle-end device by using a cellular network. Optionally, when the communication capability information is generated by the server, the server may further send the communication capability information to a roadside device by using a cellular network, and then the roadside device forwards the communication capability information to the vehicle-end device by using a V2X network. When the communication capability information is generated by the roadside device, the roadside device may directly send the communication capability information to the vehicle-end device by using a V2X network. Certainly, the communication capability information may include both communication capability information generated by the roadside device and communication capability information generated by the server.

Step S402: The vehicle-end device receives the communication capability information.

In this step, the communication capability information received by the vehicle-end device is from the server and/or the roadside device.

Step S403: The vehicle-end device determines, based on the communication capability information, a region in which a communication capability of a roadside device is lower than a first threshold, and generates warning prompt information used to prompt a driver to take over a vehicle in the region.

The vehicle-end device may determine, based on the received communication capability information, the region in which the communication capability is lower than the first threshold. In the region, a capability of the roadside device to establish a communication connection to a traffic participant is poor, and some traffic participants that actually exist may fail to establish a communication connection to the roadside device, or a communication effect of an established communication connection is poor. As a result, a risk of performing self-driving in the region is high. To improve safety, the vehicle-end device may generate the warning prompt information, to prompt the driver to take over the vehicle in the region in which the communication capability is lower than the first threshold.

Step S404: The vehicle-end device adjusts, in each region, confidence of information from a roadside device based on the communication capability information.

The vehicle-end device may determine, based on the communication capability information, a specific region in which a specific roadside device has a good communication effect and a specific region in which a specific roadside device has a poor communication effect. For example, a communication effect of a roadside device 1 in a region 1 is good, and a communication effect thereof in a region 2 is poor. A communication effect of a roadside device 2 in the region 2 is good, and a communication effect thereof in the region 1 is poor. In this case, the vehicle-end device may increase, in the region 1, confidence of information from the roadside device 1, and reduce, in the region 2, the confidence of the information from the roadside device 1; and increase, in the region 2, confidence of information from the roadside device 2, and reduce, in a region 3, the confidence of the information from the roadside device 2. In this way, when the vehicle performs self-driving in the region 2, a degree of dependency on information that is about the region 2 and that is sensed by the vehicle can be improved, a degree of dependency on information from the roadside device 2 can be improved, and a degree of dependency on information from the roadside device 1 can be reduced, thereby improving self-driving safety.

Step S405: The vehicle-end device determines, based on the communication capability information, a region in which a communication capability of a roadside device is lower than a first threshold, and when planning a driving route, enables a driving route not to pass through the region.

After determining, based on the received communication capability information, the region in which the communication capability is lower than the first threshold, the vehicle-end device may avoid the region when planning the driving route. This helps improve self-driving safety.

It may be understood that the vehicle-end device may perform one or more of step S403 to step S405. When a plurality of steps in step S403 to step S405 is performed, an execution sequence is not limited.

In a possible implementation, after receiving the communication capability information, the vehicle-end device may store the communication capability information as map data. In this way, when subsequently performing intelligent driving, the vehicle-end device may obtain the communication capability information from a map, to determine whether the driver needs to take over the vehicle when the vehicle travels to a region, whether confidence of information from a roadside device needs to be reduced in a region, or whether a region needs to be avoided during route planning, thereby improving safety.

Figure 14:
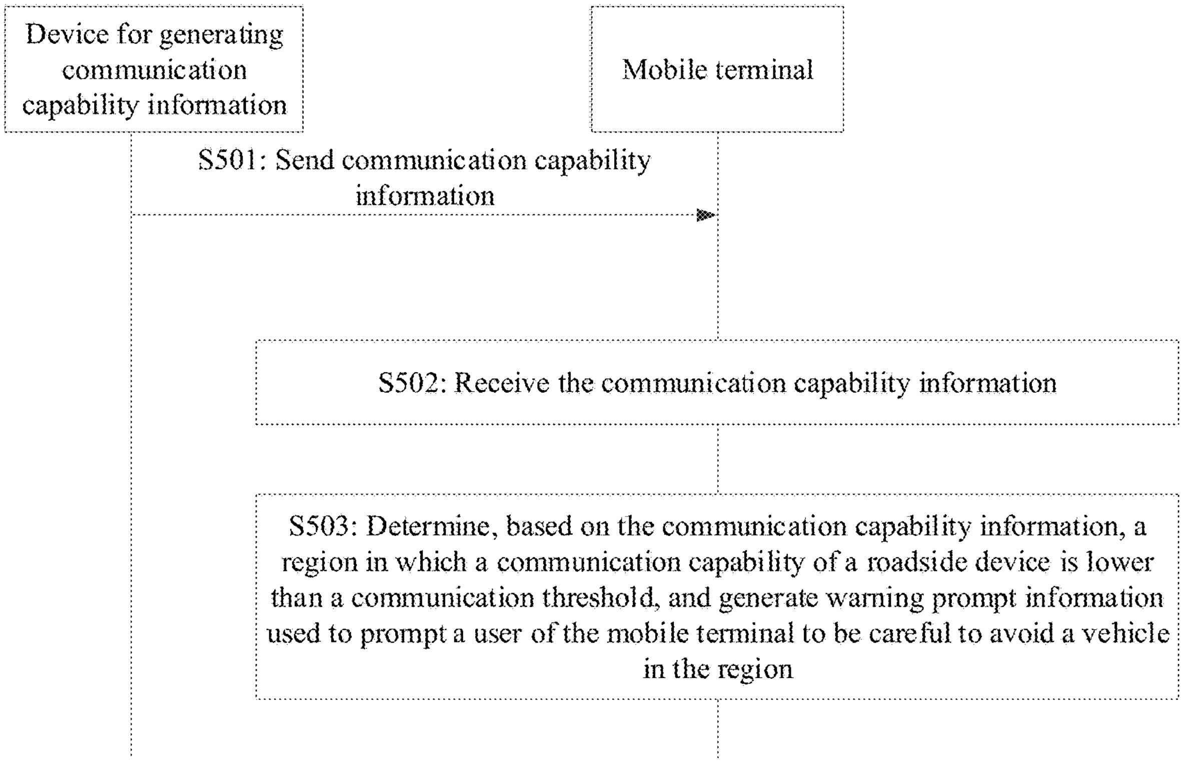
FIG. 14 is a schematic interaction diagram of a method for using communication capability information according to an embodiment of this application.

FIG. 14 is a schematic interaction diagram of a method for using communication capability information according to an embodiment of this application. As shown in FIG. 14, the method for using communication capability information may include the following steps:

Step S501: A device for generating communication capability information sends communication capability information to a mobile terminal.

Step S502: The mobile terminal receives the communication capability information.

For step S501 and step S502, respectively refer to step S401 and step S402. Details are not described herein again.

Step S503: The mobile terminal determines, based on the communication capability information, a region in which a communication capability of a roadside device is lower than a first threshold, and generates warning prompt information used to prompt a user of the mobile terminal to be careful to avoid a vehicle in the region.

In the region in which the communication capability is lower than the first threshold, because a communication effect of the roadside device is poor, and the roadside device may fail to establish a communication connection to some terminal devices in the region, or a communication effect of an established communication connection is poor, information cannot be sent to the mobile terminal in a timely manner. Consequently, the user of the mobile terminal cannot be assisted in a timely manner in finding that a vehicle or a pedestrian appears around the user. Therefore, after determining, based on the received communication capability information, the region in which the communication capability is lower than the first threshold, the mobile terminal may generate the warning prompt information, to prompt the user of the mobile terminal to be careful to avoid the vehicle in the region, thereby helping improve travel safety of the user.

Figure 15:
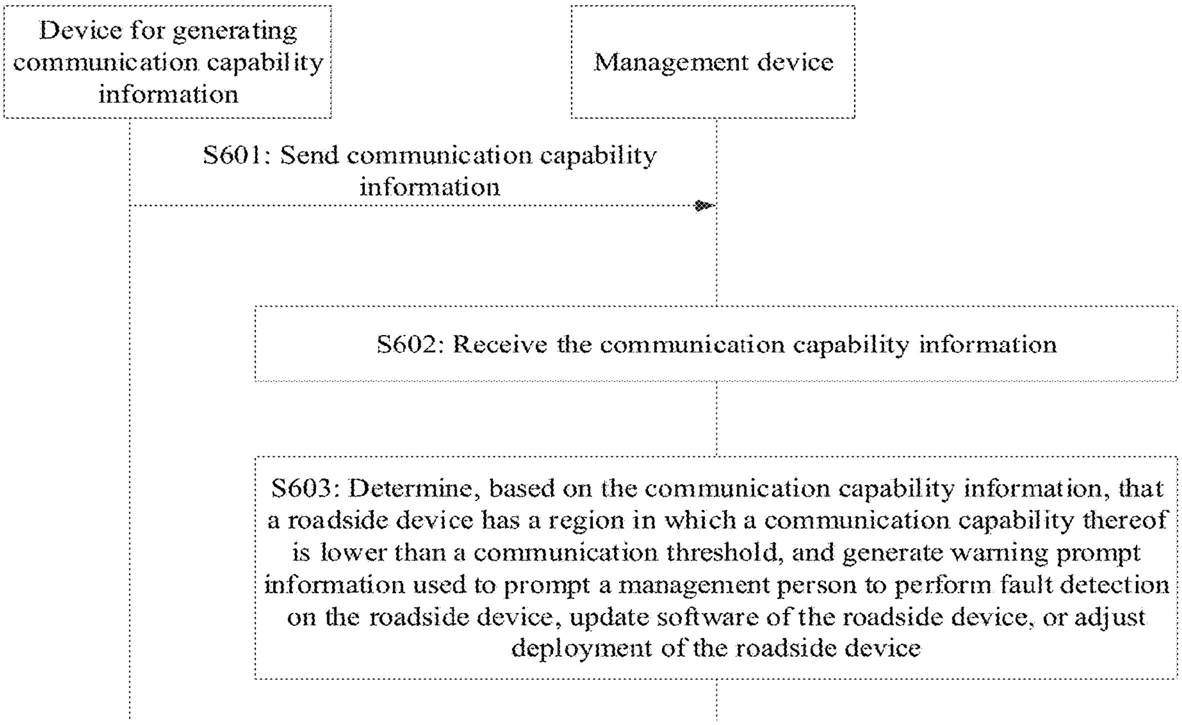
FIG. 15 is a schematic interaction diagram of a method for using communication capability information according to an embodiment of this application.

FIG. 15 is a schematic interaction diagram of a method for using communication capability information according to an embodiment of this application. As shown in FIG. 15, the method for using communication capability information may include the following steps:

Step S601: A device for generating communication capability information sends communication capability information to a management device of a roadside device.

Step S602: The management device receives the communication capability information.

For step S601 and step S602, refer to step S401 and step S402. Details are not described herein again.

Step S603: The management device determines, based on the communication capability information, that the roadside device has a region in which a communication capability thereof is lower than a first threshold, and generates warning prompt information used to prompt a management person to perform fault detection on the roadside device, update software of the roadside device, or adjust deployment of the roadside device.

When the roadside device has a region in which the communication capability thereof is lower than the first threshold, it indicates that the roadside device may be faulty, or the communication capability of the roadside device needs to be further improved, or deployment of the roadside device is inappropriate. Therefore, the management device of the roadside device may prompt the management person to perform fault check on the roadside device, update software of the roadside device, or adjust deployment of the roadside device such that the roadside device can establish a communication connection to a terminal device in a larger range, and a communication effect is improved.

Considering that an obstruction such as a green plant or a building may be added around the roadside device, a roadside sensing apparatus of the roadside device may also be blocked or damaged by a foreign object, and the roadside sensing apparatus of the roadside device may abnormally perform identification due to a climate or weather (for example, an excessively high temperature, severe haze, or sand and dust). Because software of the roadside device is updated, a communication module in the roadside device is replaced, or the like, a communication range of the roadside device changes. Therefore, in the method for generating a communication capability provided in this embodiment of this application, the generated communication capability information may be updated. The following is described by using an example in which an update process of the first communication capability information of the first roadside device.

In a possible implementation, the method further includes: when a preset condition is met, updating the first communication capability information.

In an example, the preset condition includes but is not limited to the following: Fault maintenance is performed on the first roadside device, a sensor of the first roadside device is replaced, or the first roadside device is upgraded; and a current value of a communication capability indicator indicated by the first communication capability information is abnormal relative to a statistical value of the communication capability indicator.

It may be understood that, after fault maintenance is performed on the first roadside device, the sensor of the first roadside device is replaced, or the first roadside device is upgraded, there is a large possibility that the communication capability of the roadside device changes. Therefore, the first communication capability information needs to be updated, to improve accuracy.

The following describes a case in which the current value of the communication capability indicator indicated by the first communication capability information is abnormal relative to the statistical value of the communication capability indicator. The current value of the communication capability indicator indicated by the first communication capability information may indicate communication capability information obtained in a first time period before a current moment. The statistical value of the communication capability indicator indicated by the first communication capability information may indicate communication capability information obtained in a second time period before the current moment. Duration of the first time period is less than duration of the second time period, and a moment corresponding to the first time period is later than a moment corresponding to the second time period.

For a method for generating the current value of the communication capability indicator and the statistical value of the communication capability indicator, refer to the method for generating the first communication capability information. The current value of the communication capability indicator can be obtained by limiting, to the first time period, time information of traffic participant data used in the process of generating the first communication capability information, and the statistical value of the communication capability indicator can be obtained by limiting, to the second time period, the time information of the traffic participant data used in the process of generating the first communication capability information.

When the current value of the communication capability indicator and the statistical value of the communication capability indicator meet an abnormality condition, it may be determined that the current value of the communication capability indicator is abnormal relative to the statistical value of the communication capability indicator. In this case, a current communication capability of the first roadside device changes greatly compared with a previous communication capability. Therefore, the first communication capability information needs to be updated, to improve accuracy.

In a possible implementation, that a current value of a communication capability indicator indicated by the first communication capability information is abnormal relative to a statistical value of the communication capability indicator includes a difference between a first communication region and a second communication region that correspond to a target communication capability level is greater than a first difference threshold corresponding to the target communication capability level. The target communication capability level is any one of communication capability levels of the first roadside device, the first communication region represents a communication region corresponding to the target communication capability level indicated by the current value of the communication capability indicator, and the second communication region represents a communication region corresponding to the target communication capability level indicated by the statistical value of the communication capability indicator.

For example, the current value of the communication capability indicator indicates that a communication capability level of a region 3 is a level 1 and a communication capability level of a region 4 is a level 2. The statistical value of the communication capability indicator indicates that a communication capability level of a region 5 is the level 1 and a communication capability level of a region 6 is the level 2. When a difference between the region 3 and the region 5 is greater than the first difference threshold, and/or a difference between the region 4 and the region 6 is greater than the first difference threshold, it indicates that the communication capability of the first roadside device changes greatly. In this case, it may be determined that the current value of the communication capability indicator is abnormal relative to the statistical value of the communication capability indicator. In an example, the first difference threshold may be used to indicate a position difference. When a distance between a position of the region 3 and a position of the region 5 is greater than the first difference threshold, it may be determined that the current value of the communication capability indicator is abnormal relative to the statistical value of the communication capability indicator. In another example, the first difference threshold may indicate an area difference. When the area difference between the region 3 and the region 5 is greater than the first difference threshold, it may be determined that the current value of the communication capability indicator is abnormal relative to the statistical value of the communication capability indicator. It should be noted that the foregoing descriptions are merely an example of the first difference threshold, and should not be used as a limitation.

Optionally, a weighted operation may be performed on differences between the first communication regions and the second communication regions that correspond to all communication capability levels. When an operation result is greater than a second difference threshold, it is determined that the current value of the communication capability indicator is abnormal relative to the statistical value of the communication capability indicator. For the second difference threshold, refer to the first difference threshold. Details are not described herein again.

In this embodiment of this application, whether abnormality occurs is determined by comparing communication regions of a same communication capability level. This is convenient, has high readability, and is easy to understand by the user.

In a possible implementation, that a current value of a communication capability indicator indicated by the first communication capability information is abnormal relative to a statistical value of the communication capability indicator includes: in a communication region corresponding to a target communication capability level in the statistical value of the communication capability indicator, a ratio of a data volume of position points in a current dataset B to a quantity of position points in a current dataset A is less than a third difference threshold.

The current dataset A is used to indicate traffic participant data that is in traffic participant data collected in a first time period before a current moment, that falls within a preselection range of the first roadside device, and in which working status information is a normal working state, and the current dataset B indicates a traffic participant that is in the traffic participant data indicated by the current dataset A and in which device identifier information includes identifier information of the first roadside device.

If the ratio of the quantity of position points in the current dataset B to the quantity of position points in the current dataset A is less than the third difference threshold, it indicates that a large quantity of communication connection failures occurs in the communication region corresponding to the target communication capability level. In other words, a communication effect between the first roadside device and a terminal device in the communication region corresponding to the target communication capability level is currently poor. Therefore, it may be determined that the current value of the communication capability indicator is abnormal relative to the statistical value of the communication capability indicator. The third difference threshold may be set based on a requirement. In an example, the third difference threshold corresponds to the target communication capability level, a stronger communication capability corresponding to the target communication capability level indicates a smaller value of the third difference threshold, and a weaker communication capability corresponding to the target communication capability level indicates a larger value of the third difference threshold.

For example, the communication region corresponding to the target communication capability level "level 1" in the statistical value of the communication capability indicator is a region 5, and the third difference threshold corresponding to the target communication capability level "level 1" is a threshold 1. In the region 5, if the quantity of position points in the current dataset B is a "quantity 1", the quantity of position points in the current dataset A is a "quantity 2", and the ratio of the quantity 1 to the quantity 2 is less than the third difference threshold corresponding to the level 1, it may be determined that the current value of the communication capability indicator is abnormal relative to the statistical value of the communication capability indicator.

In this embodiment of this application, in a process of generating the current value of the communication capability indicator, whether abnormality occurs is determined by comparing the quantities of position points such that abnormality can be found in a timely manner, and update can be immediately triggered when the abnormality is detected.

Figure 16:
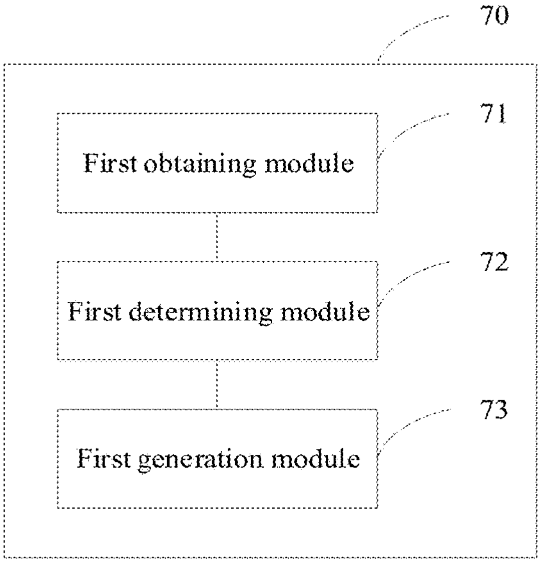
FIG. 16 is a schematic diagram of a structure of an apparatus for generating communication capability information according to an embodiment of this application.

FIG. 16 is a schematic diagram of a structure of an apparatus for generating communication capability information according to an embodiment of this application. The apparatus may be applied to a server or a first roadside device. As shown in FIG. 16, the apparatus 70 includes a first obtaining module 71 configured to obtain first communication status indication information, where the first communication status indication information is used to indicate a plurality of terminal devices to establish a communication connection to a first roadside device at a plurality of position points; a first determining module 72 configured to determine a first distribution status of the plurality of position points around the first roadside device based on the first communication status indication information; and a first generation module 73 configured to generate first communication capability information of the first roadside device based on the first distribution status, where the first communication capability information is used to indicate a communication capability of the first roadside device.

In a possible implementation, the apparatus further includes a storage module configured to store the first communication capability information as map data.

In a possible implementation, the apparatus further includes a second obtaining module configured to obtain second communication status indication information, where the second communication status indication information is used to indicate a first at least one terminal device to establish a communication connection to a second roadside device at a first at least one position point, and a distance between the first at least one position point and the first roadside device is less than a preset threshold; and a second determining module configured to determine a second distribution status of the first at least one position point around the first roadside device based on the second communication status indication information; and the first generation module is further configured to generate the first communication capability information based on the first distribution status and the second distribution status.

In a possible implementation, the apparatus further includes a third obtaining module configured to obtain third communication status indication information, where the third communication status indication information is used to indicate a second at least one terminal device to establish a communication connection to a server at a second at least one position point, the second at least one terminal device has a capability of connecting to the first roadside device, and a distance between the second at least one position point and the first roadside device is less than a preset threshold; and a third determining module configured to determine a third distribution status of the second at least one position point around the first roadside device based on the third communication status indication information; and the first generation module is further configured to generate the first communication capability information based on the first distribution status and the third distribution status.

In a possible implementation, the first communication capability information is used to indicate a first region and a communication capability of the first roadside device in the first region.

In a possible implementation, the first communication capability information is used to indicate a first scenario, a first region, and a communication capability of the first roadside device in the first scenario and the first region.

In a possible implementation, the first communication status indication information includes: position information of the plurality of position points, working status information of a plurality of communication modules in the plurality of terminal devices, connection status information between the plurality of terminal devices and the first roadside device, identifier information of the first roadside device, and time information.

In a possible implementation, the apparatus further includes a second generation module configured to generate a plurality of pieces of communication capability information of a plurality of roadside devices, where the plurality of pieces of communication capability information are used to indicate communication capabilities of the plurality of roadside devices, the plurality of roadside devices include the first roadside device, and the plurality of pieces of communication capability information include the first communication capability information; and a third generation module configured to generate communication blind area information based on the plurality of pieces of communication capability information, where the communication blind area information is used to indicate a region that is not covered by one or more of the pluralities of roadside devices.

In a possible implementation, the region that is not covered by one or more of the pluralities of roadside devices include an absolute blind area and/or a relative blind area, any one of the pluralities of roadside devices cannot reach a second threshold in the absolute blind area, and some of the plurality of roadside devices cannot reach a third threshold in the relative blind area.

In a possible implementation, the apparatus further includes an update module configured to: when a preset condition is met, update the first communication capability information, where the preset condition includes: a current value of a communication capability indicator indicated by the first communication capability information is abnormal relative to a statistical value of the communication capability indicator; fault maintenance is performed on the first roadside device; the first roadside device is upgraded; or an obstruction is added or reduced around the first roadside device.

In a possible implementation, the apparatus further includes a fourth generation module configured to generate warning prompt information based on the first communication capability information, where the warning prompt information is used to give the following prompt: taking over a vehicle by a driver in a second region, performing fault detection on the first roadside device, updating software of the first roadside device or adjusting deployment of the first roadside device, reducing confidence of information from the first roadside device in the second region, or avoiding the second region during route planning, and the first communication capability information indicates that a communication capability of the first roadside device in the second region is lower than a first threshold.

In this embodiment of this application, a region that can be reached by the communication capability of the first roadside device is determined based on the distribution status of the plurality of position points of the plurality of terminal devices that establish a communication connection to the first roadside device, to conveniently and accurately obtain a communication range of the first roadside device.

Figure 17:
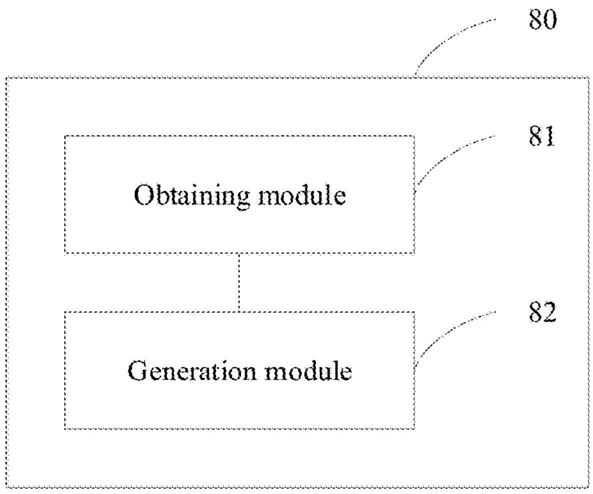
FIG. 17 is a schematic diagram of a structure of an apparatus for using communication capability information according to an embodiment of this application.

FIG. 17 is a schematic diagram of a structure of an apparatus for using communication capability information according to an embodiment of this application. The apparatus may be applied to a terminal device. As shown in FIG. 17, the apparatus 80 includes an obtaining module 81 configured to obtain communication capability information, where the communication capability information is used to indicate a region and a communication capability of a roadside device in the region; and a generation module 82 configured to: based on the communication capability information, generate warning prompt information, adjust, in the region, confidence of information communicated by the roadside device, or plan a driving route that does not pass through the region.

In a possible implementation, the communication capability information is further used to indicate a scenario and a communication capability of the roadside device in the scenario and the region.

In a possible implementation, the warning prompt information is used to give the following prompt: taking over a vehicle by a driver in the region, being careful to avoid a vehicle in the region, performing fault detection on the roadside device, reducing, in the region, confidence of information obtained by the roadside device through communication, or avoiding the region during route planning, and the communication capability information indicates that the communication capability of the roadside device in the region is lower than a first threshold.

In a possible implementation, the roadside device is a plurality of roadside devices, the region includes an absolute blind area, and the absolute blind area is a region in which communication capabilities of the plurality of roadside devices cannot reach a second threshold.

In a possible implementation, the roadside device is a plurality of roadside devices, the region includes a relative blind area, and the relative blind area is a region in which communication capabilities of some of the plurality of roadside devices cannot reach a third threshold.

In a possible implementation, the apparatus further includes a storage module configured to store the communication capability information as map data.

In this way, self-driving safety can be improved.

Figure 18:
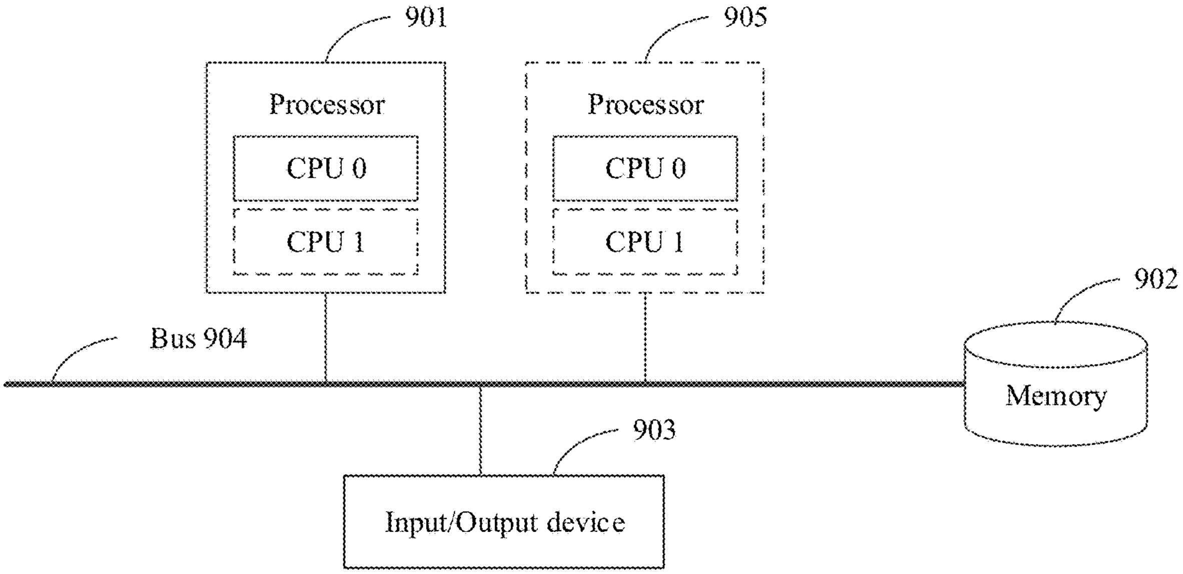
FIG. 18 is a schematic diagram of an electronic device according to an embodiment of this application.

FIG. 18 is a schematic diagram of an electronic device according to an embodiment of this application. The electronic device may perform the method shown in FIG. 2 or FIG. 17, and the electronic device may be a cloud device (for example, a server), a roadside device (for example, RSU), or a terminal device (for example, a vehicle cooperation and programming terminal), or may be a component, a module, or a chip in these devices.

As shown in FIG. 18, the electronic device may include at least one processor 901, a memory 902, an input/output device 903, and a bus 904. The following specifically describes the components of the electronic device with reference to FIG. 18.

The processor 901 is a control center of the electronic device, and may be one processor, or may be a collective term of a plurality of processing elements. For example, the processor 901 is a central processing unit (CPU), may be an application-specific integrated circuit (ASIC), or may be one or more integrated circuits configured to implement the embodiments of the present disclosure, for example, one or more microprocessors (digital signal processor (DSP)), or one or more field-programmable gate arrays (FPGAs).

The processor 901 may perform various functions of the electronic device by running or executing a software program stored in the memory 902 and invoking data stored in the memory 902.

During specific implementation, in an embodiment, the processor 901 may include one or more CPUs, for example, a CPU 0 and a CPU 1 shown in the figure.

During specific implementation, in an embodiment, the electronic device may include a plurality of processors, for example, the processor 901 and a processor 905 shown in FIG. 18. Each of these processors may be a single-core processor (single-CPU), or may be a multi-core processor (multi-CPU). The processor herein may be one or more devices, circuits, and/or processing cores configured to process data (for example, computer program instructions).

The memory 902 may be a read-only memory (ROM) or another type of static storage device that can store static information and instructions, a random-access memory (RAM) or another type of dynamic storage device that can store information and instructions, or may be an electrically erasable programmable ROM (EEPROM), a compact disc (CD) ROM or another compact disc storage, an optical disc storage (including a compact disc, a laser disc, an optical disc, a DIGITAL VERSATILE DISC (DVD), a Blu-ray disc, and the like), a magnetic disk storage medium or another magnetic storage device, or any other medium that can be used to carry or store expected program code in a form of an instruction or a data structure and that can be accessed by a computer. However, no limitation is imposed. The memory 902 may exist independently, and is connected to the processor 901 by using the bus 904. Alternatively, the memory 902 and the processor 901 may be integrated together.

The input/output device 903 is configured to communicate with another device or a communication network, for example, configured to communicate with a communication network such as a V2X network, a cellular network, an Ethernet, a radio access network (RAN), or a wireless local area network (WLAN). The input/output device 903 may include all or a part of a baseband processor, and may further optionally include a radio frequency (RF) processor. The RF processor is configured to send or receive an RF signal. The baseband processor is configured to process a baseband signal converted from an RF signal, or a baseband signal to be converted into an RF signal. In this embodiment of this application, the input/output device 903 may be configured to transmit one or more of first communication status indication information, a first distribution status, first communication capability information, second communication status indication information, a second distribution status, third communication status indication information, a third distribution status, a plurality of pieces of communication capability information, blind area information, and warning prompt information.

During specific implementation, in an embodiment, the input/output device 903 may include a transmitter and a receiver. The transmitter is configured to send a signal to another device or a communication network, and the receiver is configured to receive a signal sent by the other device or the communication network. The transmitter and the receiver may exist independently, or may be integrated together.

The bus 904 may be an Industry Standard Architecture (ISA) bus, a Peripheral Component Interconnect (PCI) bus, an Extended Industry Standard Architecture (EISA) bus, or the like. The bus may be classified into an address bus, a data bus, a control bus, and the like. For ease of representation, only one thick line is used to represent the bus in FIG. 18, but this does not mean that there is only one bus or only one type of bus.

The structure of the device shown in FIG. 18 does not constitute a limitation on the electronic device, and the device may include more or fewer components than those shown in the figure, or combine some components, or have different component arrangements.

An embodiment of this application provides a map. The map includes communication capability information, and the communication capability information is used to indicate a region and a communication capability of a roadside device in the region.

In a possible implementation, the communication capability information is further used to indicate a scenario and a communication capability of the roadside device in the scenario and the region.

In a possible implementation, the roadside device is a plurality of roadside devices, the region includes an absolute blind area, and the absolute blind area is a region in which communication capabilities of the plurality of roadside devices cannot reach a second threshold.

In a possible implementation, the roadside device is a plurality of roadside devices, the region includes a relative blind area, and the relative blind area is a region in which communication capabilities of some of the plurality of roadside devices cannot reach a third threshold.

In a possible implementation, the map further includes warning prompt information, the warning prompt information is used to give the following prompt: taking over a vehicle by a driver in the region, being careful to avoid a vehicle in the region, performing fault detection on the roadside device, reducing, in the region, confidence of information obtained by the roadside device through communication, or avoiding the region during route planning, and the communication capability information indicates that the communication capability of the roadside device in the region is lower than a first threshold.

An embodiment of this application provides a vehicle. The vehicle includes one or more of the foregoing apparatuses for using communication capability information, for example, the vehicle-end device shown in FIG. 13.

An embodiment of this application provides a non-volatile computer-readable storage medium. The non-volatile computer-readable storage medium stores computer program instructions, and when the computer program instructions are executed by a processor, the method for generating communication capability information or the method for using communication capability information is implemented.

An embodiment of this application provides a computer program product, including computer-readable code or a non-volatile computer-readable storage medium carrying computer readable code. When the computer-readable code runs in a processor of an electronic device, the processor in the electronic device performs the method for generating communication capability information or the method for using communication capability information.

The computer-readable storage medium can be a tangible device that can retain and store instructions for use by an instruction execution device. The computer-readable storage medium may be, for example, but is not limited to an electrical storage device, a magnetic storage device, an optical storage device, an electromagnetic storage device, a semiconductor storage device, or any suitable combination of the foregoing devices. More specific examples (non-exhaustive list) of the computer-readable storage medium include: a portable computer disk, a hard disk, a RAM, a ROM, an erasable programmable ROM (PROM (EPROM), an electrically erasable PROM (EEPROM), a flash memory, a static RAM (SRAM), a portable CD-ROM, a DVD, a memory stick, a floppy disk, a mechanical coding device, for example, a punched card or a protrusion structure in a groove that stores instructions, and any suitable combination of the foregoing devices.

Computer-readable program instructions or code described herein can be downloaded from a computer-readable storage medium to each computing/processing device or to an external computer or an external storage device by using a network, such as the Internet, a local area network, a wide area network, and/or a wireless network. The network may include a copper transmission cable, optical fiber transmission, wireless transmission, a router, a firewall, a switch, a gateway computer and/or an edge server. A network adapter card or network interface in each computing/processing device receives the computer-readable program instructions from the network and forwards the computer-readable program instructions for storage in a computer-readable storage medium in each computing/processing device.

The computer program instruction used to perform the operations in this application may be an assembly instruction, an instruction set architecture (ISA) instruction, a machine instruction, a machine-related instruction, microcode, a firmware instruction, status setting data, or source code or object code written in any combination of one or more programming languages. The programming language includes an object-oriented programming language such as Smalltalk and C++, and a conventional procedural programming language such as a "C" language or a similar programming language. The computer-readable program instructions may be executed entirely on a user computer, partly on the user computer, as a stand-alone software package, partly on the user computer and partly on a remote computer, or entirely on the remote computer or a server. When a remote computer is used, the remote computer may be connected to a user computer by using any type of network, including a local area network (LAN) or a wide area network (WAN), or may be connected to an external computer (for example, an Internet connection by using an Internet service provider). In some embodiments, an electronic circuit, for example, a programmable logic circuit, an FPGA, or a programmable logic array (PLA), is customized by using status information of a computer-readable program instruction. The electronic circuit may execute the computer-readable program instruction, to implement various aspects of this application.

These computer-readable program instructions may be provided to a processor of a general-purpose computer, a special-purpose computer, or another programmable data processing apparatus to produce a machine such that the instructions, when executed by the processor of the computer or the other programmable data processing apparatus, create an apparatus for implementing functions/acts specified in one or more blocks in the flowcharts and/or block diagrams. These computer-readable program instructions may alternatively be stored in the computer-readable storage medium. These instructions enable a computer, a programmable data processing apparatus, and/or another device to work in a specific manner. Therefore, the computer-readable medium storing the instructions includes an artifact that includes instructions for implementing the various aspects of the functions/acts specified in the one or more blocks in the flowcharts and/or the block diagrams.

The computer-readable program instructions may alternatively be loaded onto a computer, another programmable data processing apparatus, or another device so that a series of operation steps is performed on the computer, the other programmable data processing apparatus, or the other device to produce a computer-implemented process. Therefore, the instructions executed on the computer, the other programmable data processing apparatus, or the other device implements the functions/acts specified in the one or more blocks in the flowcharts and/or block diagrams.

The flowcharts and block diagrams in the accompanying drawings show system architectures, functions, and operations that may be implemented by apparatuses, systems, methods, and computer program products according to a plurality of embodiments of this application. In this regard, each block in the flowcharts or block diagrams may represent a module, a program segment, or a part of the instructions, and the module, the program segment, or the part of the instructions includes one or more executable instructions for implementing a specified logical function. In some alternative implementations, a function marked in the block may also occur in a sequence different from that marked in the accompanying drawings. For example, two consecutive blocks may be actually executed substantially in parallel, and may sometimes be executed in a reverse order, depending on a function involved.

It should also be noted that each block in the block diagram and/or the flowchart, and a combination of blocks in the block diagram and/or the flowchart may be implemented by hardware (for example, a circuit or an ASIC) that performs a corresponding function or action, or may be implemented by a combination of hardware and software, for example, firmware.

Although the present application is described with reference to the embodiments, in a process of implementing the present application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of "a plurality of". A single processor or another unit may implement several functions enumerated in the claims. Some measures are recorded in dependent claims that are different from each other, but this does not mean that these measures cannot be combined to produce a better effect.

The foregoing has described the embodiments of this application. The foregoing descriptions are examples, are not exhaustive, and impose no limitation on the disclosed embodiments. Many modifications and variations are apparent to a person of ordinary skill in the art without departing from the scope of the described embodiments. The selection of terms used herein is intended to best explain the principles of the embodiments, actual application, or improvements to technologies in the market, or to enable another person of ordinary skill in the art to understand the embodiments disclosed herein.

What is claimed is:

1. A method implemented by one or more processors, wherein the method comprises:

obtaining first communication status indication information, wherein the first communication status indication information indicates a plurality of first position points at which a plurality of terminal devices has established a first communication connection to a first roadside device to indicate that the first position points fall within a communication range of the first roadside device and that a first communication capability of the first roadside device can reach the first position points;

determining, based on the first communication status indication information, a first distribution status of the first position points around the first roadside device;

determining, based on the first distribution status, a stable connection rate, wherein the stable connection rate is a ratio of a first quantity of the first position points at which the first communication connection is established to a second quantity of position points at which communication connections to the first roadside device are capable of being established;

generating, based on the stable connection rate, communication capability information indicating the first communication capability of the first roadside device; and storing the communication capability information as map data usable by a vehicle system to control route planning or driving behavior.

2. The method of claim 1, further comprising:

obtaining second communication status indication information, wherein the second communication status indication information indicates a first terminal device of the terminal devices establishing a second communication connection to a second roadside device at a first position point of the first position points, and wherein a distance between the first position point and the first roadside device is less than a preset threshold;

determining, based on the second communication status indication information, a second distribution status of the first position point around the first roadside device; and further generating, based on the first distribution status and the second distribution status, the communication capability information.

3. The method of claim 2, further comprising:

determining the stable connection rate based on the first distribution status and the second distribution status; and generating the communication capability information based on the stable connection rate.

4. The method of claim 1, further comprising:

obtaining third communication status indication information, wherein the third communication status indication information indicates a second terminal device of the terminal devices establishing a third communication connection to a server at a second position point of the first position points, wherein the second terminal device has a capability of connecting to the first roadside device, and wherein a distance between the second position point and the first roadside device is less than a preset threshold;

determining, based on the third communication status indication information, a third distribution status of the second position point around the first roadside device; and further generating, based on the first distribution status and the third distribution status, the communication capability information.

5. The method of claim 4, further comprising:

determining the stable connection rate based on the first distribution status and the third distribution status; and generating the communication capability information based on the stable connection rate.

6. The method of claim 1, wherein the communication capability information indicates a first region and the first communication capability in the first region.

7. The method of claim 1, wherein the communication capability information indicates a first scenario, a first region, and the first communication capability in the first scenario and the first region.

8. The method of claim 1, wherein the first communication status indication information comprises position information of the first position points, working status information of a plurality of communication systems in the terminal devices, connection status information between the terminal devices and the first roadside device, identifier information of the first roadside device, and time information.

9. The method of claim 1, further comprising:

generating a plurality of pieces of communication capability information of a plurality of roadside devices, wherein the pieces of communication capability information indicate communication capabilities of the roadside devices, wherein the roadside devices comprise the first roadside device, and wherein the pieces of communication capability information comprise the communication capability information; and generating, based on the pieces of communication capability information, communication blind area information indicating a region that is not covered by one or more of the roadside devices.

10. The method of claim 9, wherein the region comprises an absolute blind area and/or a relative blind area, wherein any one of the roadside devices cannot reach a second threshold in the absolute blind area, and wherein some of the roadside devices cannot reach a third threshold in the relative blind area.

11. The method of claim 1, further comprising updating the communication capability information when a preset condition is met, wherein the preset condition comprises:

a current value of a communication capability indicator of the communication capability information is abnormal relative to a statistical value of the communication capability indicator;

fault maintenance is performed on the first roadside device;

the first roadside device is upgraded; or an obstruction is added or reduced around the first roadside device.

12. The method of claim 1, further comprising generating, based on the communication capability information, warning prompt information, wherein the warning prompt information comprises:

taking over a vehicle by a driver in a second region;

performing fault detection on the first roadside device;

updating software of the first roadside device;

adjusting deployment of the first roadside device;

reducing confidence of information from the first roadside device in the second region; or avoiding the second region during route planning, wherein the communication capability information indicates that a second communication capability of the first roadside device in the second region is lower than a first threshold.

13. The method of claim 1, wherein the first distribution status is a density of a first position point.

14. A method implemented by one or more processors, comprising:

obtaining communication capability information indicating a region and a first communication capability of a roadside device in the region, wherein the communication capability information is based on communication status indication information, wherein the communication status indication information indicates a plurality of first position points at which a plurality of terminal devices has established a first communication connection to the first roadside device to indicate that the first position points fall within a communication range of the roadside device and that the first communication capability of the roadside device can reach the first position points, wherein a distribution status of the first position points around the roadside device is based on the communication status indication information, wherein a stable connection rate is based on the distribution status, wherein the stable connection rate is a ratio of a first quantity of the first position points at which the first communication connection is established to a second quantity of position points at which communication connections to the roadside device are capable of being established, and wherein the communication capability information is based on the stable connection rate; and storing the communication capability information as map data usable by a vehicle system to control at least one of:

generating warning prompt information;

adjusting, in the region, confidence of information from the roadside device; or planning a driving route that does not pass through the region.

15. The method of claim 14, wherein the communication capability information further indicates a scenario and a second communication capability of the roadside device in the scenario and the region.

16. The method of claim 14, wherein the communication capability information indicates that the first communication capability is lower than a first threshold, and wherein the warning prompt information prompts:

taking over a vehicle by a driver in the region;

performing fault detection on the roadside device;

reducing, in the region, confidence of information from the roadside device through communication; or avoiding the region during route planning.

17. The method of claim 14, wherein the roadside device is one of a plurality of roadside devices, and wherein the region comprises an absolute blind area in which communication capabilities of the roadside devices cannot reach a second threshold.

18. The method of claim 14, wherein the roadside device is one of a plurality of roadside devices, and wherein the region comprises a relative blind area in which communication capabilities of some of the roadside devices cannot reach a third threshold.

19. An apparatus comprising:

a memory configured to store instructions; and one or more processors coupled to the memory and configured to:

obtain first communication status indication information, wherein the first communication status indication information indicates a plurality of first position points at which a plurality of terminal devices has established a first communication connection to a first roadside device to indicate that the first position points fall within a communication range of the first roadside device and that a first communication capability of the first roadside device can reach the first position points;

determine, based on the first communication status indication information, a first distribution status of the first position points around the first roadside device;

determine, based on the first distribution status, a stable connection rate, wherein the stable connection rate is a ratio of a first quantity of the first position points at which the first communication connection is established to a second quantity of position points at which communication connections to the first roadside device are capable of being established;

generate, based on the stable connection rate, communication capability information indicating the first communication capability of the first roadside device; and store the communication capability information as map data usable by a vehicle system to control route planning or driving behavior.

20. The apparatus of claim 19, wherein the first communication connection is established using a vehicle-to-everything (V2X) communication protocol.

* * * * *